United States Patent [19]

Johanson

[11] Patent Number: 5,784,517

[45] Date of Patent: *Jul. 21, 1998

[54] ILLUMINATION DEVICES AND METHODS OF FORMING SAME

[76] Inventor: Walter A. Johanson, 250 E. 5th St., #401, St. Paul, Minn. 55101

[ * ] Notice: The term of this patent shall not extend beyond the expiration date of Pat. No. 5,483,119.

[21] Appl. No.: 570,405

[22] Filed: Dec. 11, 1995

Related U.S. Application Data

[63] Continuation-in-part of Ser. No. 55,188, Apr. 30, 1993, Pat. No. 5,475,785, and a continuation-in-part of Ser. No. 77,415, Jun. 15, 1993, Pat. No. 5,483,119.

[51] Int. Cl.$^6$ .................................................. G02B 6/00
[52] U.S. Cl. ........................... 385/146; 362/32; 385/133; 385/901
[58] Field of Search ........................... 362/32; 385/100, 385/133, 900, 901, 146

[56] References Cited

U.S. PATENT DOCUMENTS

| | | | |
|---|---|---|---|
| 4,260,220 | 4/1981 | Whitehead | 385/133 |
| 4,422,719 | 12/1983 | Orcutt | 385/123 |
| 4,542,449 | 9/1985 | Whitehead | 362/330 |
| 4,615,579 | 10/1986 | Whitehead | 385/133 |
| 4,750,798 | 6/1988 | Whitehead | 385/133 |
| 4,787,708 | 11/1988 | Whitehead | 385/133 |
| 4,791,540 | 12/1988 | Dreyer, Jr. et al. | 362/331 |
| 4,805,984 | 2/1989 | Cobb, Jr. | 385/133 |
| 4,834,495 | 5/1989 | Whitehead et al. | 385/133 |
| 4,850,665 | 7/1989 | Whitehead | 385/133 |
| 5,016,143 | 5/1991 | Aikens | 362/32 |
| 5,095,415 | 3/1992 | Anderson et al. | 362/329 |
| 5,109,465 | 4/1992 | Klopotek | 385/133 |
| 5,117,478 | 5/1992 | Cobb, Jr. et al. | 385/133 |
| 5,475,785 | 12/1995 | Johanson | 385/100 |
| 5,483,119 | 1/1996 | Johanson | 313/498 |

FOREIGN PATENT DOCUMENTS

| | | |
|---|---|---|
| 0235447A2 | 9/1987 | European Pat. Off. . |
| 0236030A3 | 9/1987 | European Pat. Off. . |
| 0290267A2 | 11/1988 | European Pat. Off. . |
| 4-303548 | 10/1992 | Japan ........................ 313/635 |
| 4303548(A) | 10/1992 | Japan . |
| 2112166 | 7/1983 | United Kingdom . |
| 2145760 | 4/1985 | United Kingdom ........ 385/133 |

OTHER PUBLICATIONS

Whitehead et al. "New Efficient Light Guide for Interior Illumination", Applied Optics, vol. 21, No. 15, Aug. 1982, pp. 2755–2757.

3M Scotch Optical Lighting Film Application Bulletin–Photometrics, Sep. 1989, pp. 1–10, 3M Traffic Control Materials Div.

SPIE vol. 692 Materials and Optics for Solar Energy Conversion and Advanced Lighting Technology (Aug. 1986), pp. 235–240.

Product Information Bulletin–Scotch VHB Joining Systems, "Double Coated Acrylic Foam Tapes and Adhesive Transfer Tapes", Apr. 1990.

Scotchlamp Film Pamphlet by 3M, 12 pp, no date.

European Search Report dated Nov. 24, 1995.

European Search Report dated Sep. 14, 1989.

*Primary Examiner*—John D. Lee
*Attorney, Agent, or Firm*—Galgano & Burke

[57] ABSTRACT

Illumination devices and methods of forming illumination devices, utilizing optical light films are disclosed. Joints useful in forming light carriers from optical light films are also disclosed.

3 Claims, 19 Drawing Sheets

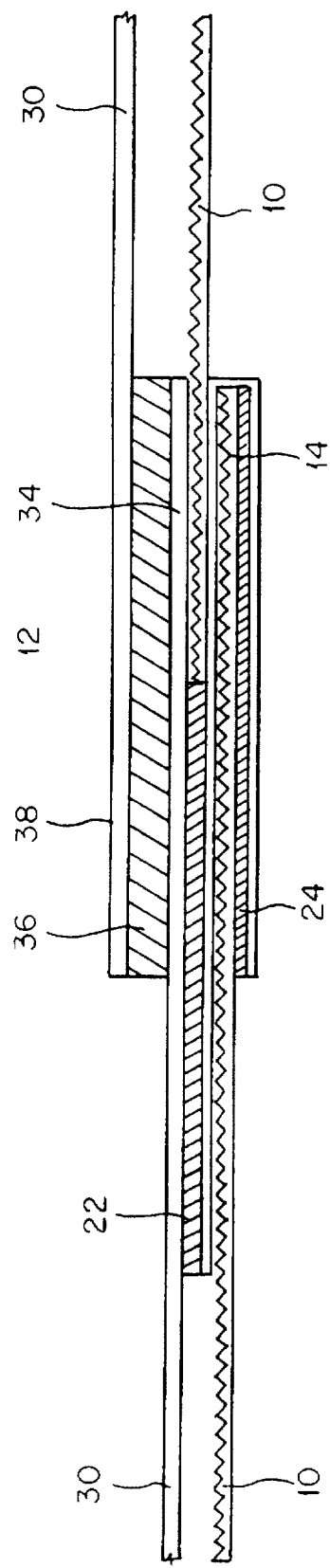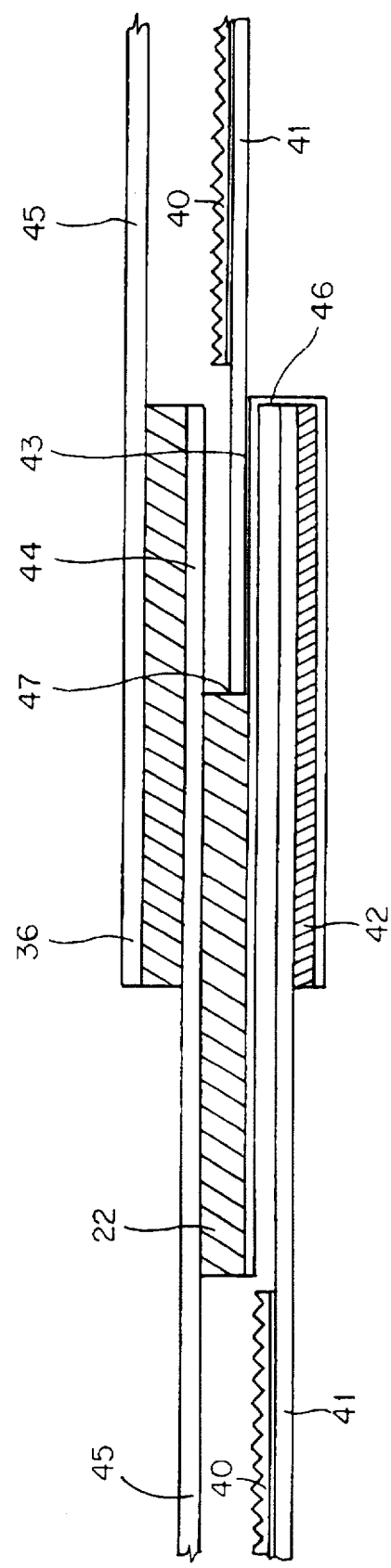

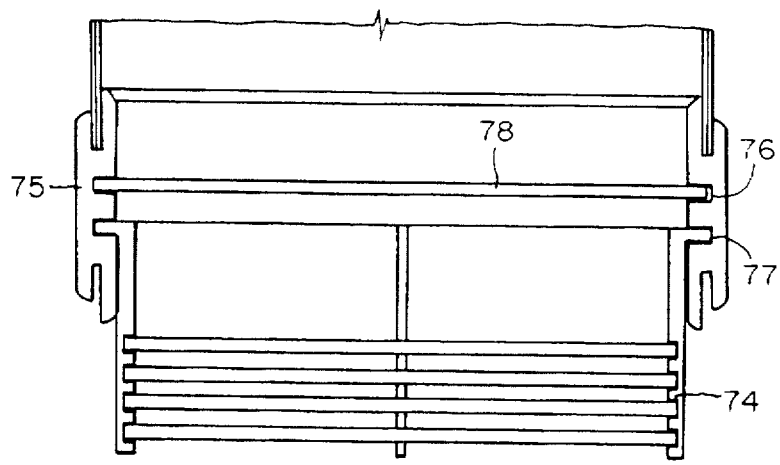
FIG. 7
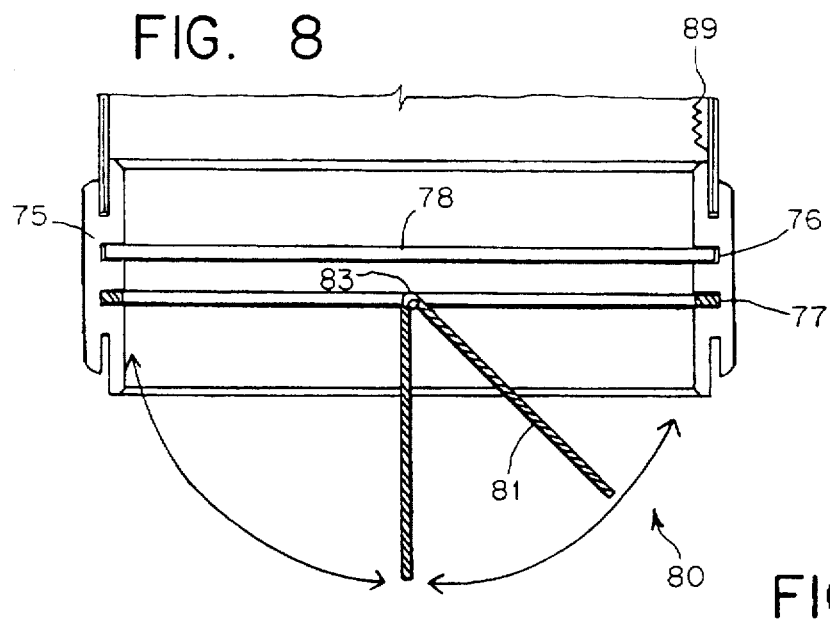
FIG. 8
FIG. 9
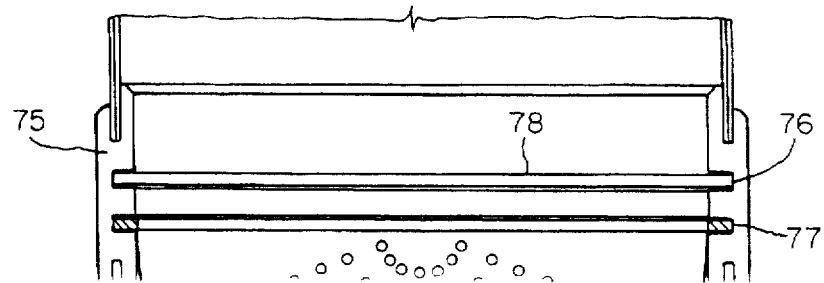

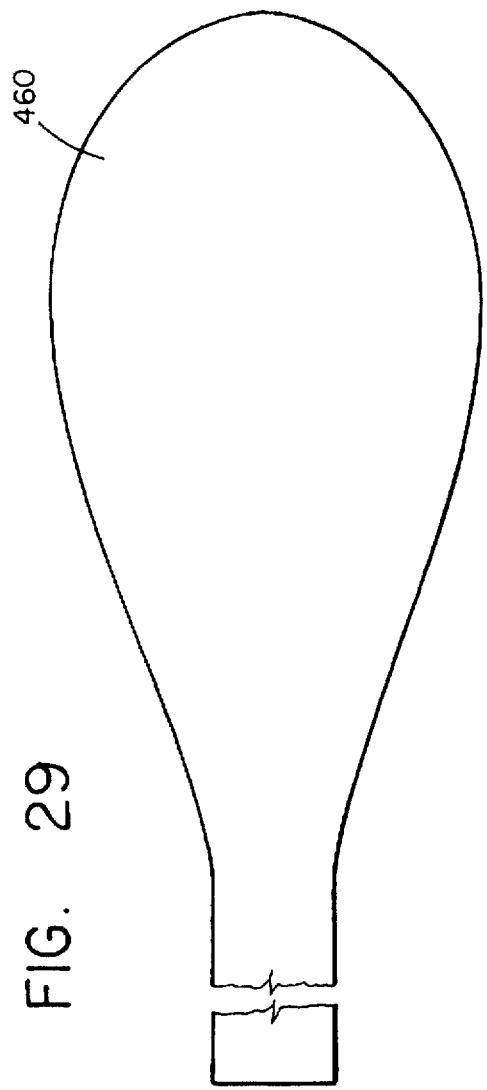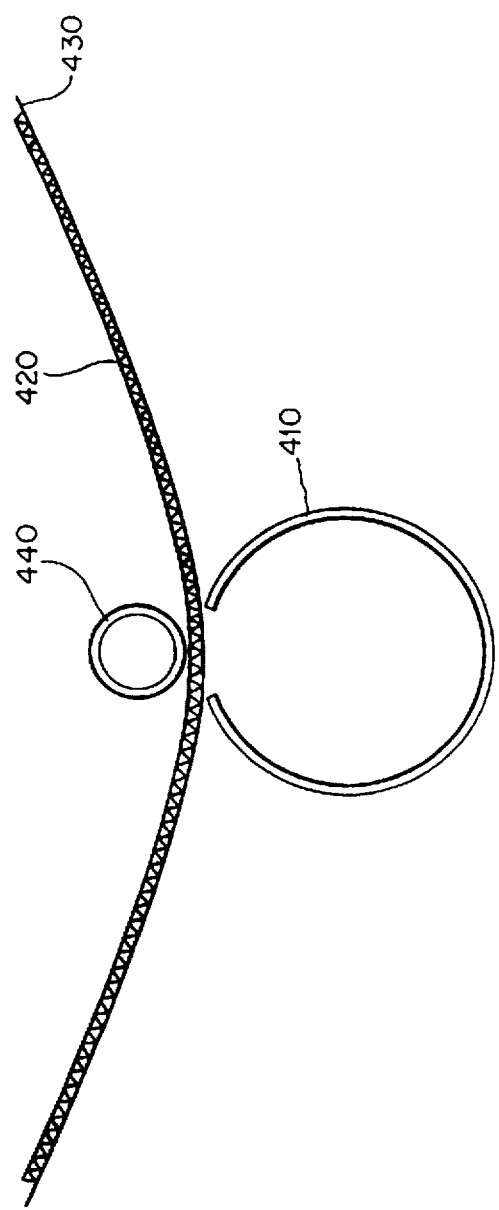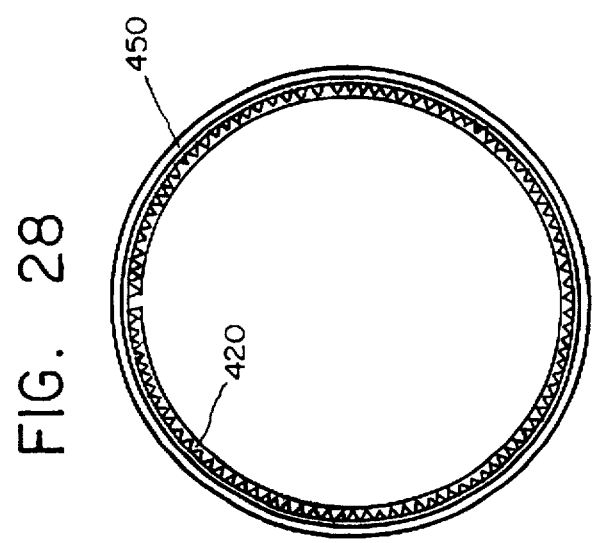

ILLUMINATION DEVICES AND METHODS OF FORMING SAME

This application is a continuation in part of U.S. patent application Ser. No. 08/055,188 filed on Apr. 30, 1993, now U.S. Pat. No. 5,475,785, and U.S. patent application Ser. No. 08/077,415 filed Jun. 15, 1993, now U.S. Pat. No. 5,483,119.

BACKGROUND OF THE INVENTION

The present invention relates to light conducting and light emitting tubes, herein referred to as "light tubes", and novel optical light films having an embossed prism pattern to contain and channel the light when formed into a tube. More particularly, the present invention is concerned with laminated tube construction and methods of constructing light tubes to achieve a wide range of illumination effects including the piping of light from an accessible, concentrated light source to distal areas and the release of such light in widely variable patterns.

Optical light films (OLFs) can be efficiently manufactured from polymers in flat, flexible, but fragile films and made to perform a myriad of illumination functions. The film can be formed into various tubular and other partially closed configurations by supporting it together with supplemental light controlling films or elements in preformed carrier tubing having light-permeable characteristics. For example, a sheet of OLF can be formed into a closed tube by disposing one longitudinal edge of the OLF adjacent the opposite longitudinal edge. Alternatively, a sheet of OLF can also be formed into a partially closed tube, for example having an arched cross-section, and maintained in such a configuration with a supporting structure. As used herein, the term "tube" is meant to include both closed and partially closed configurations.

In addition to carrying light from a source of illumination such as a high-intensity light bulb to a remote location, light tubes can also be used for emitting light over relatively large areas. For this purpose, various methods have been devised to direct light out of a light tube over portions of the tube length. One method involves placing a clear adhesive tape on the outer, grooved side of an optical light film. A clear tape placed in this manner reduces the internal reflectance of the optical light film in the taped area and essentially creates a window for "escaping" light. Another method simply involves removing a section of the optical light film where internal reflectance is not desired. Portions of a tube lacking optical light film will permit light to escape. A third method comprises forming a light tube with some means for directing the light at the walls of the optical light film at an angle greater than about 28°. At such angles of incidence, the internal reflectance of the optical light film is greatly reduced. For example, the 3M Company of St. Paul, Minn., produces a product marketed under the name "2370" which directs incident light at an angle of about 90° to the angle of incidence. If a piece of "2370" is positioned within a light tube, light moving generally along the longitudinal axis of the tube will be directed through the "2370" substantially perpendicular toward a sidewall and out of the light tube. Another product, marketed under the name "SCOTCH-CAL EXTRACTOR FILM™", directs light toward and through an opposite interior wall.

Since optical light film is fragile and sensitive to dirt and moisture, it is typically positioned within protective, outer tubes. Such tubes are generally transparent and can have a variety of finishes, e.g. clear, matte, colored or opaque. The ability to insert the fragile optical light films into a carrier tubing, typically an extrusion product, is an impediment to the light tube designer. Moreover, shipping fabricated light tubes is costly because of their high volume relative to volume of component displacement and their inherent vulnerability to damage by breaking and scratching. Thus the low manufacturing cost of the critical optical film component is heavily offset by shipping costs. Also lost is the ability of the designer to achieve at acceptable cost finished products which feature many of the useful and underlying lighting functions which the optical light film is inherently capable of performing.

It would therefore be desirable to provide novel methods for forming light tubes and light tube products using the films which are cost effective, optically efficient and functionally varied.

SUMMARY OF THE INVENTION

The present invention comprises improvements in methods of forming light carriers and the resulting light carriers comprising optical light film.

One embodiment of the present invention comprises an optical light film formed with a generally U-shaped connector which, along with other elements, forms slots for securely receiving at least portions of the longitudinal edges of the optical light film. This embodiment advantageously permits on-site fabrication of light tube having substantially total (i.e. 360°) internal reflectance.

Another embodiment of the present invention comprises an improved optical light film which advantageously allows controlled amounts of light to exit the light tube without the need for supplemental extractors.

Another embodiment of e present invention comprises a decorative light fixture comprising a source of illumination, a light tube comprising OLF which emits light over the length of the tube and is also provided with an emitter for changing the direction of light exiting the distal end of the light tube.

A still further embodiment of the present invention comprises a decorative illumination device comprising a light tube disposed substantially concentrically within an outer protective tube.

A further aspect of the present invention comprises a novel, heat resistant connector which provides a durable connection between light tubes or portions of light tubes, for example between a optical light film tube and a bulb housing.

Another aspect of the present invention comprises a light tube comprising a tapering, optical light film tube. As explained in greater detail below, a substantially continuous illumination may be obtained over the length of a light tube by providing a carefully measured converging taper to the light tube in the direction extending away from the source of illumination.

Another decorative embodiment of the present invention comprises two sheets of optical light film positioned with the grooves in contact and with the grooves disposed at an angle of at least 45°, and most preferably at an angle of substantially 90°. This embodiment creates the decorative illusion of a flame in the light tube. Colored filters can be used to provide images of flames of different colors.

Another embodiment of the present invention comprises a first sheet of optical light film connected to an outer, protective sheet of a second material in an area remote from the edges of the two sheets. The opposing longitudinal edges of both sheets are configured such that the second edge of the optical light film is positioned between the first edge of optical light film and the first edge of the outer protective sheet while the second edge of the outer protective sheet is connected with a first edge region of the protective sheet. This light tube provides a sheet of optical light film substantially surrounded by an outer, protective sheet which facilitates maintaining the optical light film in a clean, dry and optically efficient condition.

Another aspect of the present invention comprises connecting two sheets in a manner similar to that described above and disposing at least one sheet of optical light film between the two sheets.

These and other embodiments are described in further detail below.

BRIEF DESCRIPTION OF THE DRAWINGS

FIGS. 3–5 are cross-sectional views illustrating the arrangement of films and a connector of two embodiments of the present invention.

FIGS. 7–12 illustrate various emitters which may be used with the illumination device illustrated in FIG. 6.

FIGS. 21–28 illustrate methods of the present invention for disposing a light tube within a preformed carrier.

FIG. 29 illustrates a plunger which is useful with the methods illustrated in FIGS. 21–28.

DETAILED DESCRIPTION

One embodiment of the present invention is directed to a light carrier comprising at least one sheet of optical light film 10 which is maintained in a tube configuration by a novel joint. The optical light film preferably has enough flexibility and sufficient width so that one longitudinal edge 14 can be moved to a position proximate the other longitudinal edge 14 thereby forming a tube, preferably having a generally cylindrical shape. Unless otherwise specified, the term "optical light film" is used herein to refer to flexible films having a surface comprising a plurality of substantially triangular grooves which reflect substantially all of the light incident on the opposite side of the film at an angle of less than about 28° when formed into a light tube. Such film is available from the 3M Corporation, St. Paul, Minn.

Figure 1:
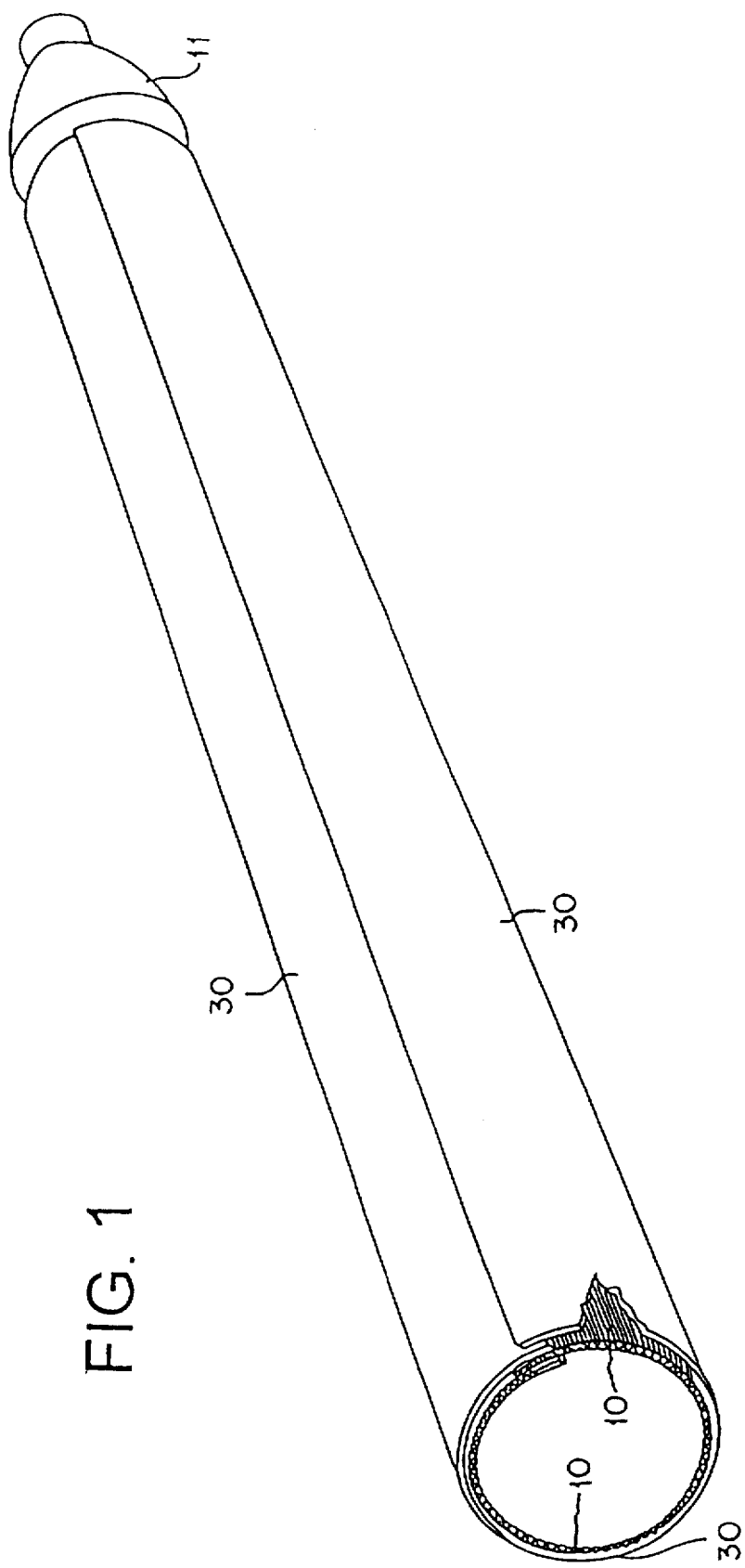
FIG. 1 is a perspective view of a light tube and bulb of one embodiment of the present invention.
Figure 2:
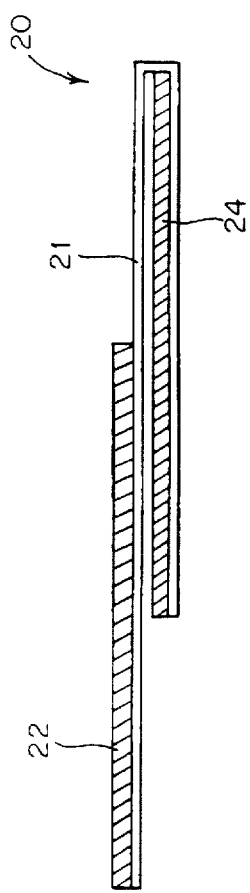
FIG. 2 is a cross-sectional view of a connector used with the light tube illustrated in FIG. 1.

According to this embodiment of the present invention, which is illustrated in FIGS. 1–5, the opposing longitudinal edge regions of an optical light film 10 are maintained in position using a generally U-shaped connector 20 proximate bulb 11. With reference to FIG. 2 which illustrates one particularly preferred embodiment of a U-shaped connector 20, comprising a pliable strip 21 provided with a first strip of adhesive tape 22 on the top of one end of the flexible strip and a second strip of adhesive tape 24 positioned on the bottom of the other longitudinal edge of strip 21. The strip 21, which is preferably formed of a clear polymeric material, is then simply configured to form the generally U-shaped connector 20 illustrated in FIG. 2. As illustrated, according to this embodiment, the upper side of the U-shaped connector 20 is preferably longer than the bottom side and the first adhesive tape 22 affixed to the upper side does not extend to the point on the strip 20 where the strip 20 is folded. As shown, once the flexible strip is folded into the U-shape, the second adhesive tape 24 is on the inner surface of the U-shaped member and the first adhesive 22 is on an outside surface of the U-shaped member.

As illustrated, it is not necessary that both sides of the U-shaped member have the same length. It will also be noted that the adhesive tape may be a double-sided adhesive tape, i.e., a central carrier having adhesive on both sides. More preferably, the adhesive tape can be a Very High Bond Tape available from the 3M Corporation of St. Paul, Minn. which exhibits adhesiveness throughout. Those skilled in the art will also appreciate that the thickness of the adhesive tape utilized can be varied for different applications depending upon such factors as the strength required and any thickness characteristics inherent in the particular tube design.

Figure 3:
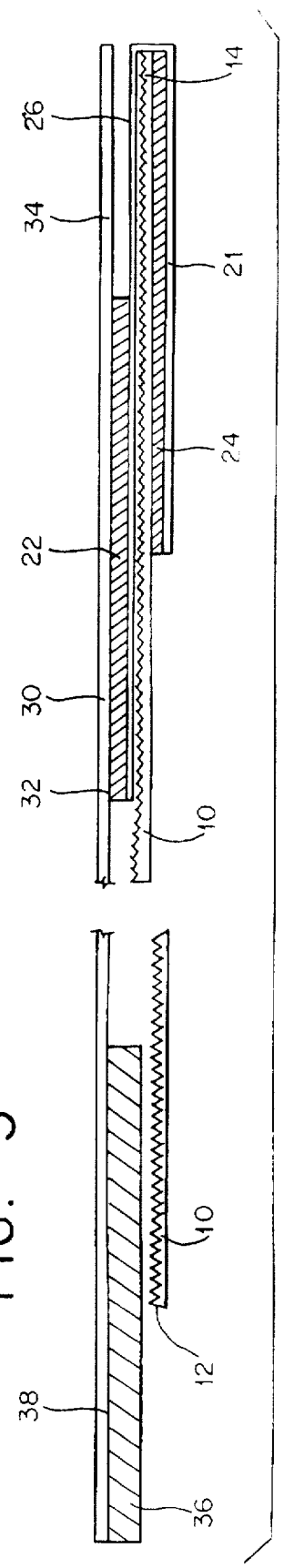

According to the illustrated embodiment, a second flexible sheet 30 substantially surrounds and protects the optical light film 10. In forming this embodiment, at least a portion of longitudinal edge 12 of the optical light film 10 is inserted into the slot defined by the second adhesive tape 24 and the inner surface of the U-shaped connector 20. With reference to FIG. 3, a contact region 32 which is remote from a longitudinal edge of the second sheet 30 is then contacted with the first adhesive tape 22. The longitudinal edge region 34 of the second sheet 30, along with the exposed, upper, outer surface 26 of the U-shaped member, forms a slot for receiving the other end of the optical light film 10. Prior to configuring the optical light film 10 to form the substantially closed light tube, another strip of adhesive tape 36 is preferably positioned on the bottom surface the opposing edge of the second sheet 30 proximate opposing edge 38. In this manner, when the sheets are configured to place the edge of the optical light film 10 into the slot defined by the U-shaped member 20 and the first edge region 34 of the second sheet 30, the second edge region 38 of the second sheet 30 can be readily adhered to the top of the first edge region 34 of the second sheet 30 in the manner illustrated in FIG. 4. This embodiment is particularly useful in forming tubes with predetermined diameter(s) over the length of the tube. Additionally, this embodiment advantageously permits on-site fabrication of light tube having substantially total (i.e. 360°) internal reflectance.

Depending upon the intended use of the light tube, it may be desirable to sandwich one or more sheets of optical light film between sheets of polymeric material. According to an alternative embodiment of the present invention illustrated in FIG. 5, this can be readily accomplished in a fashion similar to the embodiment illustrated in FIGS. 2–4 by positioning a sheet of optical light film 40 on the exterior side of a third sheet 41 which is preferably at least approximately the same size as the optical light film 40 and then inserting the third sheet 41 into the slots defined above. Namely, one longitudinal edge of sheet 41 is advantageously inserted into a first slot defined by an inside wall of the U-shaped connector 46 and an adhesive 42, and the opposite longitudinal edge is placed into a second slot defined by an outside surface 43 of the U-shaped member 46 and an edge region 44 of the outermost sheet 45. From the present description, those skilled in the art will appreciate that the upper longitudinal edge regions, as shown in FIGS. 2–5, will be held within the second slot in part, due to an edge bond with the adhesive tape 47 positioned on the upper, outer surface 43 of the U-shaped member 46. This edge bond provides additional adherence but is not necessary in order to practice this embodiment of the present invention.

Another embodiment of the present invention utilizes the decorative advantages of a light tube in a novel light fixture. In accordance with the illustrated embodiment shown in FIG. 6, this light fixture comprises a light source, preferably comprising a metal halide bulb 51, a ballast 52, a decorative light tube 60 and a light emitter 75. While the illustrated embodiment shows a metal halide bulb it is also within the scope of the present invention to use other types of bulbs, such as sulphur bulbs.

According to the illustrated embodiment which is in the form of a hanging light fixture, a support hanger 50 is suitably wired to a supply of electrical power and to ballast 52 which in turn powers bulb 51. According to the illustrated embodiment, bulb 51 is preferably positioned within a protective housing.

Figure 6:
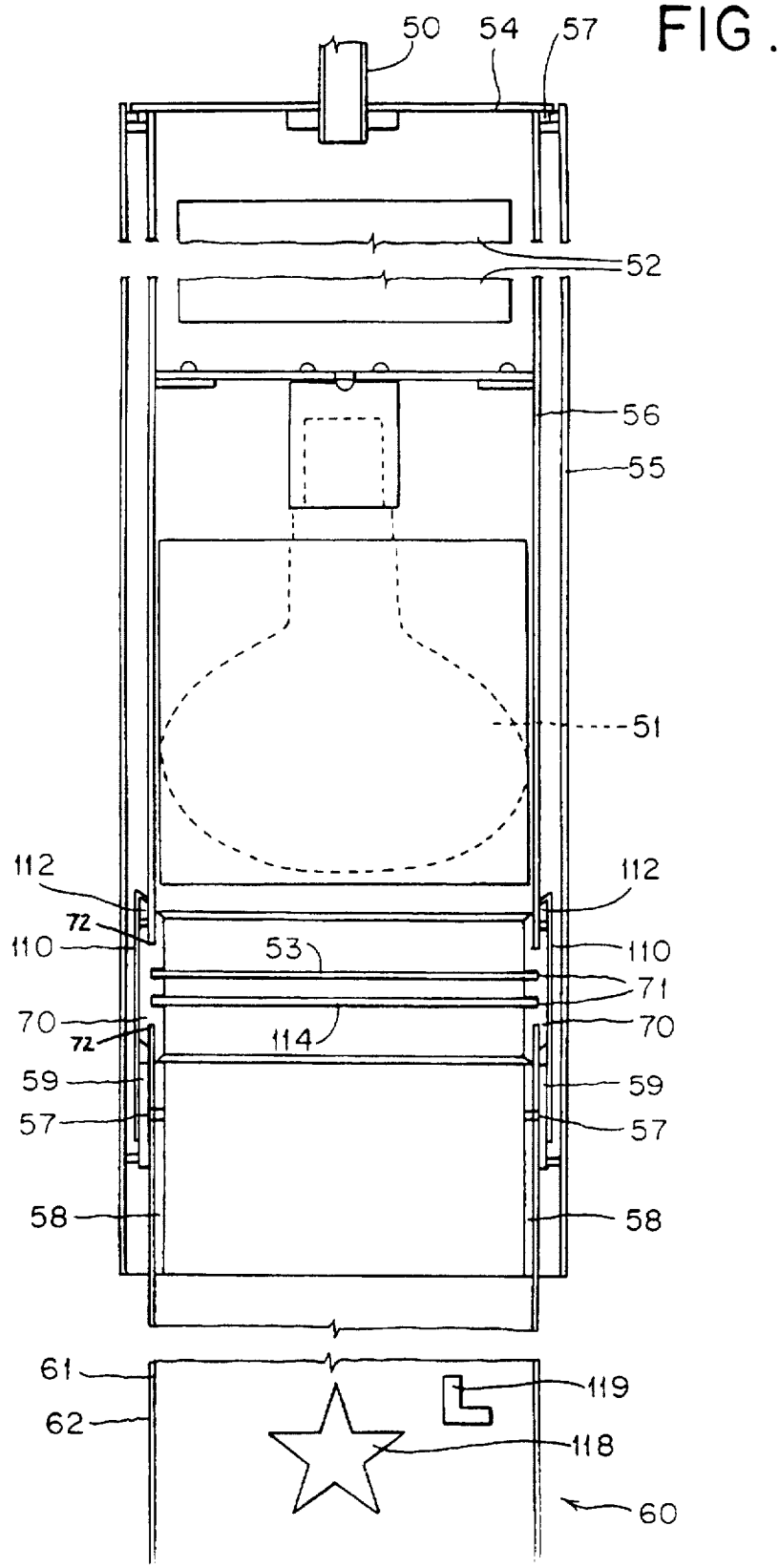
FIG. 6 is a cross-sectional view of an illumination device of the present invention.

As shown in FIG. 6, the illustrated housing comprises outer sleeve 55 and an inner sleeve 56. Outer sleeve 55 is removably connected to a top cover 54 by a twist connector 57. Outer sleeve 55 can therefore be readily removed by simply rotating outer sleeve 55 relative to top cover 54. Inner sleeve 56 is advantageously provided with sufficient openings to allow a person to change bulb 50 after outer sleeve 55 has been removed. Outer sleeve 55 can then be raised back into position and secured to upper support 54.

As shown in FIG. 6, light tube 60 is suspended from inner sleeve 56. While those skilled in the art will appreciate that there are many suitable methods of connecting light tube 60 to inner wall 56, the illustrated embodiment utilizes a mechanical connection comprising screws 57 which pass through holes in clips 110 light tube 60. Clips 110 are suspended from flanges 112 which are connected, for example by welding, to inner wall 56. Clips 110 extended downwardly beyond retaining ring 70 and preferably overlap a portion of light tube 60. In order to provide greater support and reduce the likelihood of damage to the light tube 60, a substantially rigid support ring 58 is advantageously positioned inside the upper portion of light tube 60. The substantially rigid ring may be formed of any suitable material, for example, a metal such as polished aluminum. The illustrated embodiment also comprises a spacer 59 in order to maintain the light tube 60 and inner protective wall 56 in a substantially-parallel spaced relation. Therefore, supporting screws 57 pass through holes in rigid support ring 58, light tube 60, spacer 59 and clips 110. Screws 57 do not contact outer protective sleeve 55 and therefore do not interfere with the movement of outer sleeve 55 when it is necessary to change a light bulb 51. In this manner, vertical support is provided to light tube 60 and light tube 60 is also substantially thermally insulated from the heat of bulb 51.

In order to obtain desired lighting effects, it may be desirable to position lenses, for example colored lenses, or light filters between bulb 51 and light tube 60. For this purpose, a retaining ring 70 is advantageously disposed below bulb 51. In the illustrated embodiment, a lens 53 is maintained in a position substantially perpendicular to the longitudinal axis of the light tube with a retaining ring 70 formed of a heat resistant material. For example, the retaining ring 70 may be formed of a silicone compound, such as "6750 or 6770 silicon resin" sold by General Electric Company of Waterford, N.Y., which is sufficiently pliable to allow the retaining ring 70 to be positioned within the bulb housing and also to permit the placement of lenses. The illustrated retaining ring 70 is provided with two inwardly facing grooves 71 and two vertically disposed grooves 72, one opening upwardly and the other opening downwardly.

As illustrated in FIG. 6, light tube 60 of the illustrated embodiment advantageously extends upwardly beyond the upper edge of rigid ring 58 into the lower slot 72 of lens retaining ring 70. A suitable heat-resistant adhesive may also be used within lower vertical groove 72 for bonding retaining ring 70 onto light tube 60. The mechanical connection performed by screws 57 provides support to retaining ring 70. Retaining ring 70 may also be used to support a clear tempered glass lens. Tempered glass is particularly advantageous since it prevents some of the ultraviolet waves and heat emitted by a light source from harming the polymers used in this illumination device. It also keeps out dust and moisture. Retaining ring 70 may also be used to support a colored filter 114 in order to create desired illumination effect.

While those skilled in the art will appreciate that variations in the construction of the illustrated light tube 60 may be made without departing from the scope of the present invention, for purposes of illustration, the light tube shown in FIG. 6 is shown as simply comprising an inner sheet of optical light film 61 and an outer sheet 66 of a protective polymeric material. From the present description and drawings, those skilled in the art will also appreciate that a wide variety of designs may be employed in the construction of light tube 60. The amount of light exiting through the side walls of the light tube can be varied through the use of extractors described above and/or interruptions in the optical light film. FIG. 6 illustrates an extractor 118 formed into the shape of a star and a relieved section 119 wherein the optical light film has been removed in order to interrupt the internal reflectance in these areas.

The direction of light exiting the bottom of the light tube may be controlled by a light emitter. Light emitter may be of a wide variety of designs depending on the desired illumination. The emitter, which is shown in greater detail in FIG. 7, comprises an outlet cap 75 formed of a heat resistant material, such as a silicone compound. Outlet cap 75 preferably comprises at least an upper-inwardly facing slot 76 and a lower inwardly-facing slot 77 in the same manner as retaining ring 70. Upper slot 76 is preferably utilized to support a protective, transparent bottom cover 78 which may be formed of any suitable, heat-resistant material such as a transparent tempered glass. Bottom cover 78 serves to prevent dust, other dirt and moisture from entering the interior of the light tube. Lower slot 77 supports a light emitter 74 which comprises four glass disks positioned substantially perpendicular longitudinal axis of the light tube.

Another light emitter 80 is illustrated in FIGS. 8 and 9. Light emitter 80 comprises a plurality of reflectors 81 pivotally supported on hinge 83 in a manner which permits reflectors 81 to be positioned at various angles relative to the longitudinal axis of the tube. According to this embodiment, the user of the light carrier is provided with the option of reflecting substantially all incident light back into the light tube or positioning one of the reflectors at an angle to direct the light out of the egress end of the tube at an angle to the longitudinal axis of the light tube.

Figure 10:
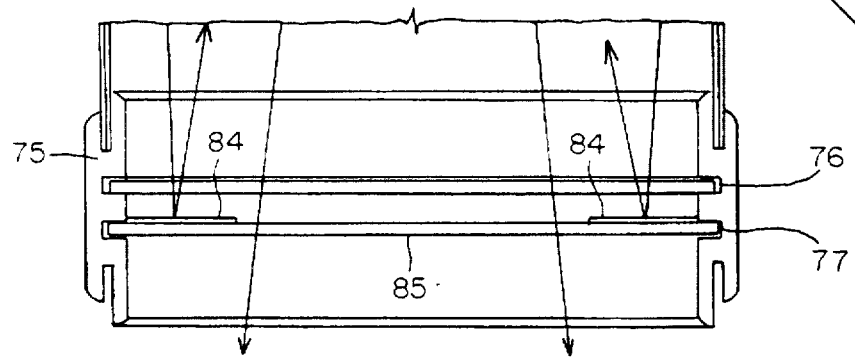

In the emitter illustrated in FIG. 10, a reflective ring is disposed in the lower slot of outlet cap 75 in order to reflect the portion of the light closest to the walls of light tube 60 back into the light tube. The outer portion 84 of the reflective ring is reflective while the inner portion 85 is transparent.

Figure 11:
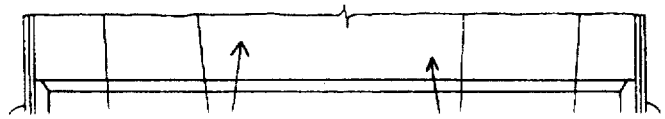

An alternative embodiment is illustrated in FIG. 11 wherein the lower slot 77 of outlet cap 75 supports a disk having an outer transparent portion 86 and an inner reflective portion 87. This embodiment of the present invention reflects the portion of light near the central longitudinal axis of the light tube back into the tube while allowing an outer ring of light to be emitted.

Figure 12:
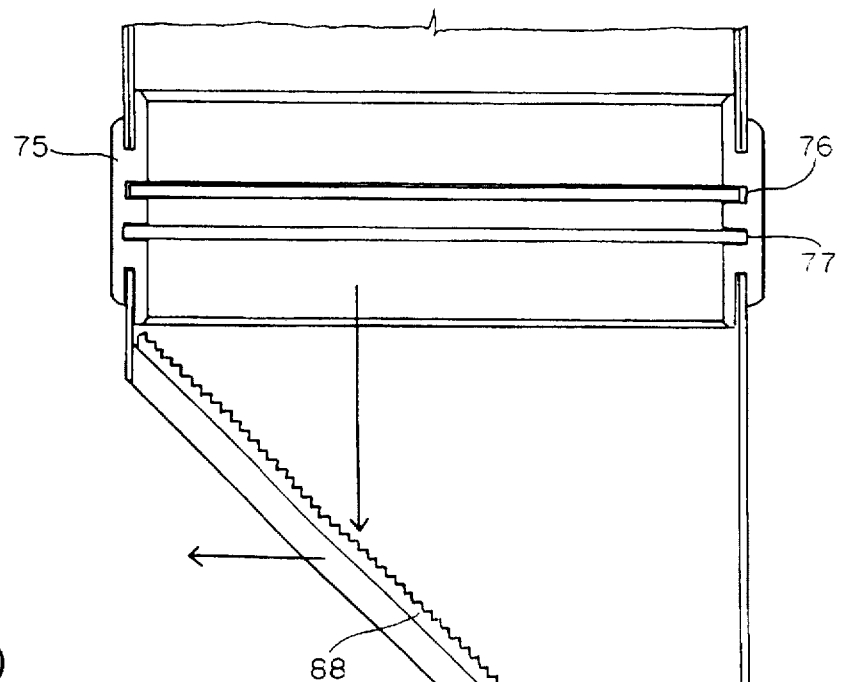

According to a still further embodiment of the present invention illustrated in FIG. 12, a right angle turning lens 88, may be positioned at an angle of 45° to the longitudinal axis of light tube 60 in order to direct the light at an angle substantially perpendicular to the central longitudinal axis of the tube. Those skilled in the art will appreciate that other lenses could be used for directing light at different angles.

Those skilled in the art will also appreciate that the decorative aspects of the light tubes illustrated in FIGS. 6-12 can be varied through the use of colored filters or colored protective polymeric films or tubes.

Another preferred aspect of these embodiments of the present invention comprise some manner of extracting light out of these illuminations devices in the region of the optical light film. For example, one of the extractors described above may be utilized. A section of the OLF can also be cut away to provide a relieved section 119, preferably in the form of some decorative shape. From the present description, it will be appreciated that by removing a portion of the optical light film, the internal reflectance at such portions of the illumination device is eliminated. Various shapes and letters can be cut from the optical light film or an extractor 89 can be employed in the manners illustrated in FIG. 6.

Figure 13:
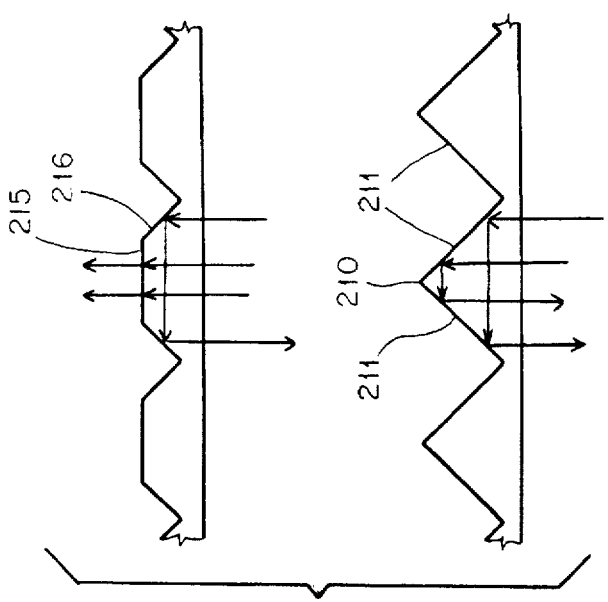
FIGS. 13 and 14 illustrate an optical light film of the present invention.
Figure 14:
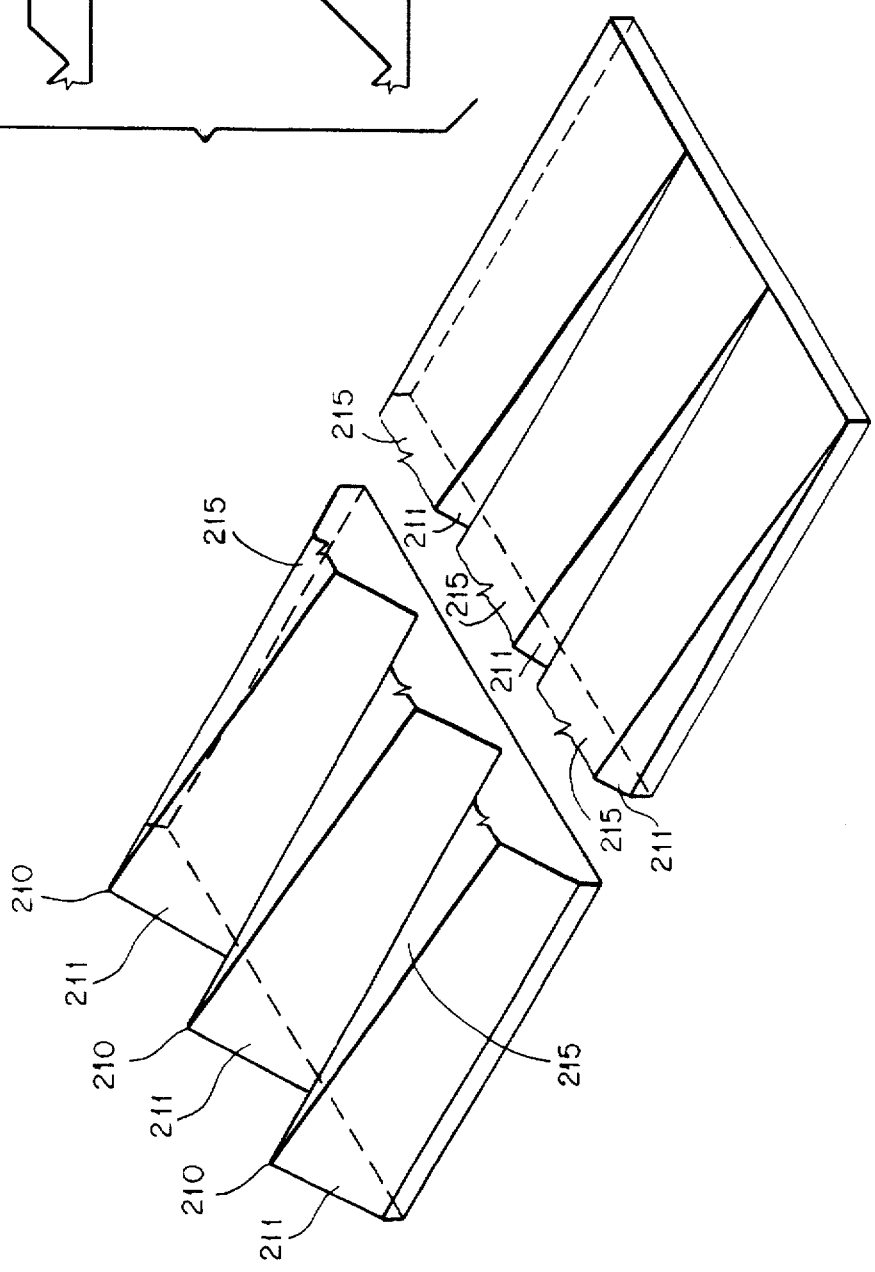
Figure 15:
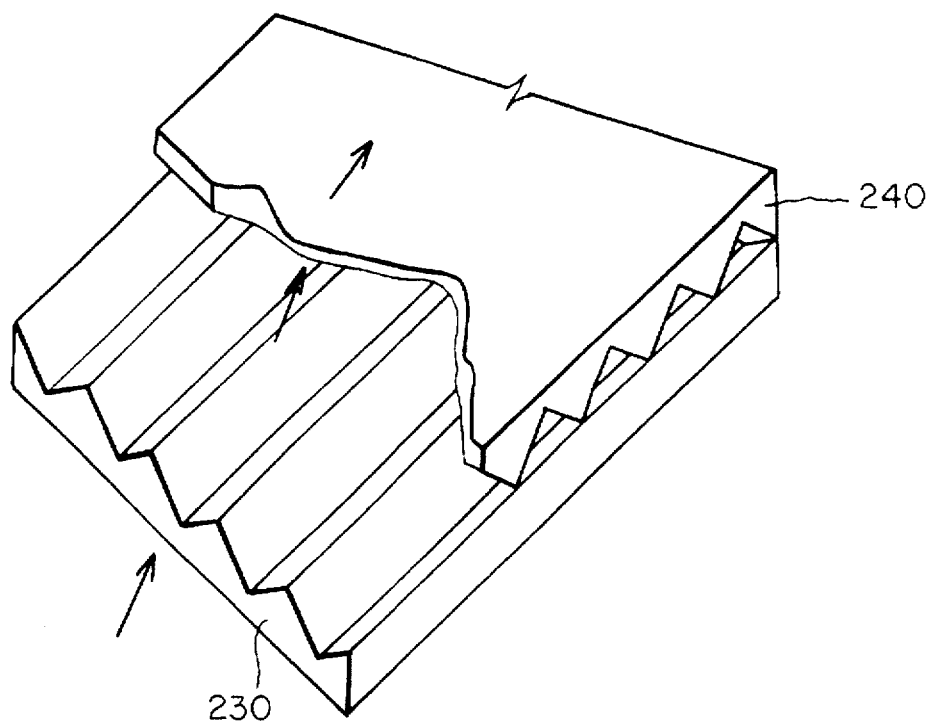
FIGS. 15 and 16 illustrate the arrangement of a plurality of optical light films used in another embodiment of the present invention.

Another aspect of the present invention comprises a light tube formed with an improved optical light film. According to this embodiment of the present invention which is illustrated in FIGS. 13-15, some of the peaks on the grooved side of an optical light film are modified in order to reduce the internal reflectance of those areas of the optical light film. Those skilled in the art will appreciate that the internal reflectance property of optical light film is dependent upon precisely formed ridges on the outside surface of a light tube. These ridges are typically formed with sidewalls converging at angles of about 90°. If, however, these ridges are modified by removing a portion of the peak, light incident on the modified portion will have a much greater tendency to "escape" from the light tube than in a conventional light tube. This embodiment of the present invention advantageously eliminates the need for supplemental extractors which are used to reduce the internal reflectance of a portion of the optical light film.

With reference to FIG. 13, conventional peak 210 is defined by converging sidewalls 211 which meet at an angle of about 90° forming a substantially triangular cross section. Typically, light incident upon one side wall 211 of a tube at an angle of incident less than about 28° will be reflected to the adjacent sidewall of the same peak and then reflected internally back into the interior of the light tube. In the illustrated embodiment, light incident on a modified portion 215 will escape while light incident on an unmodified portion 216 of a modified peak will still be internally reflected.

The peaks of the light film can be modified after manufacturing in any suitable manner. For example, the ridges may be precisely milled, scraped, melted, e.g. with a laser beam, or if less precision is required, crushed between rigid rollers. Those skilled in the art will appreciate that the amount of light escaping through a modified peak will be dependent upon the amount of the peak that has been modified. As shown in FIG. 14, a single ridge can have different degrees of modification in order to permit a greater amount of incident light to exit at one end of the tube. Those skilled in the art will appreciate that a greater amount of light will typically pass through the tube (escape) at the end closer to the source of illumination. Therefore, by modifying a greater portion of the ridge at the distal end which is further away from the light source, a substantially constant amount of light can be emitted over the entire length of the tube.

In addition to providing the method of modifying optical light film described above, the present invention also includes an optical light film which is initially formed without perfect peaks in desired areas in order to allow the escape of light in those regions.

Figure 16:
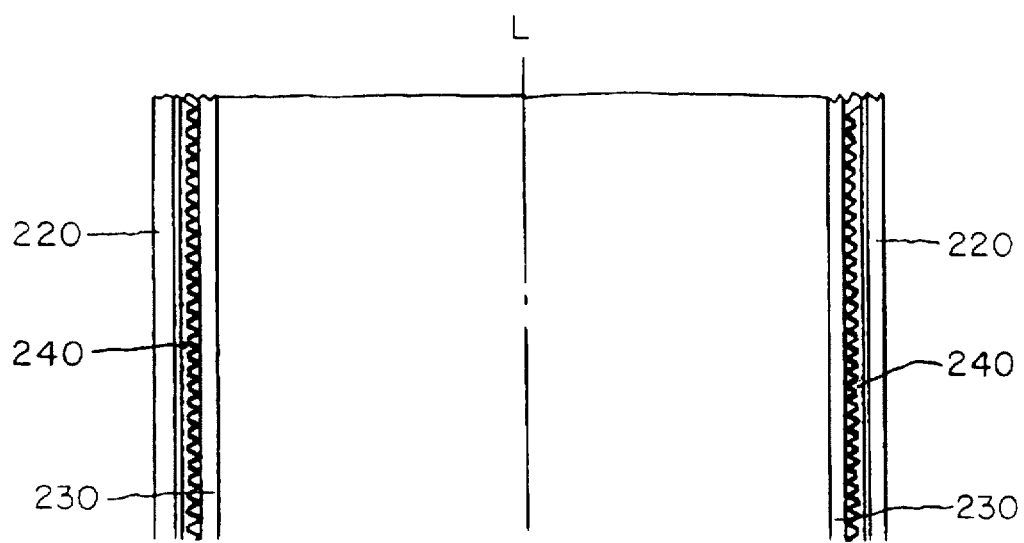

Another embodiment of the present invention provides a decorative light carrier which creates an apparently changing illumination, generally in the shape of a flame, as the distance between the observer and the device changes. This embodiment, which is illustrated in FIGS. 15–16, is formed by placing two sheets of optical light film into contact, with the ridged sides touching and with the ridges positioned at an angle of at least 45°, preferably at least 70° and most preferably substantially perpendicular. This decorative light tube is most preferably arranged such that the ridges of the inner optical light film are arranged in the same direction as the longitudinal axis of the tube. According to the preferred illustrated embodiment shown in FIG. 16, two sheets of optical light film are disposed within a protective outer transparent film 220. The ridges of the inner optical film 230 are preferably positioned substantially parallel to longitudinal axis L while the ridges of the outer optical light film 240 extend circumferentially around the tube.

Figure 17:
FIGS. 17 and 18 illustrate the effects of using a tapering light tube of another embodiment of the present invention.
Figure 18:
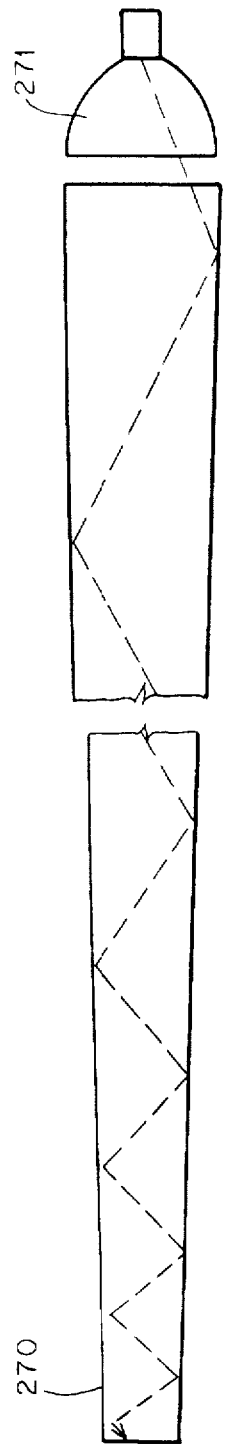

Another embodiment of the present invention provides a light tube having a diameter which decreases toward the distal end 270 of the light tube, i.e., in the direction away from the source of illumination 271. Since the amount of light escaping from a tube is directly proportional to the amount of light striking the sidewalls of the tube, at angles less than the critical angle of reflectance which is about 28°, greater quantities of light can be emitted from the distal end by decreasing the diameter of the tube and thereby increasing the incidence of light on the small end of the tube. FIGS. 17 and 18 illustrate this principle wherein a light ray emanating from a light source impinges upon the sidewall of two light tubes, one having a constant diameter and the other tapered. As generally illustrated, the taper will increase the frequency of contacts between a light beam and the sidewalls of a light tube. This embodiment is preferably constructed by cutting a sheet of optical light film into a trapezoidal shape, shaping the optical light film into a tapered tube, and securing the ends of the tapered light tube. The length of the tube and the degree of taper are limited only by the starting materials. For example, one such tapered tube has an ingress end with a diameter of about eight inches which tapers down to an egress diameter of about four inches over a longitudinal length of about 4 feet.

Figure 19:
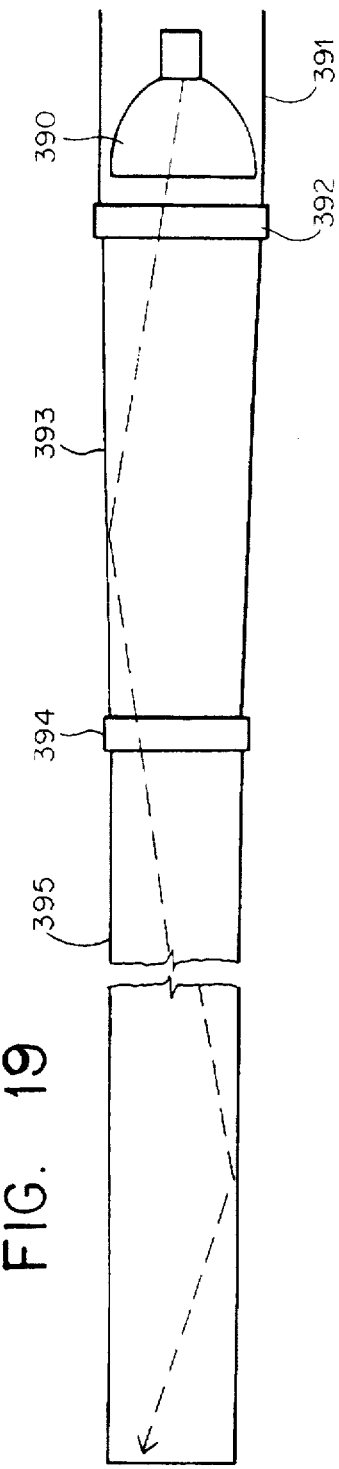
FIG. 19 illustrates an illumination device of another embodiment of the present invention which utilizes at least one tapering light tube.

From the present description, it will be appreciated that rings, such as the heat resistant retaining rings described above, will have many uses in illumination devices. Rings constructed in the fashion illustrated in FIGS. 6–12 may also be utilized to form other useful illumination devices. For example, FIG. 19 illustrates another use of a tapering light tube 393 and heat-resistant rings 392, 394. In this embodiment of the present invention, a light source 390 is positioned within a light housing 391. The light housing 391, which has a first diameter, is connected to a tapering light tube 393 with a ring 392. Ring 392 is preferably of the type illustrated above in FIGS. 6–12. A second ring 394 having a different diameter is utilized to connect the other end of tapering tube 393 to another light tube which has a diameter or cross-sectional configuration which is different from that of light housing 391. This embodiment of the present invention is particularly suited for connecting elements that have cross-sections of different sizes and/or shapes.

Figure 20:
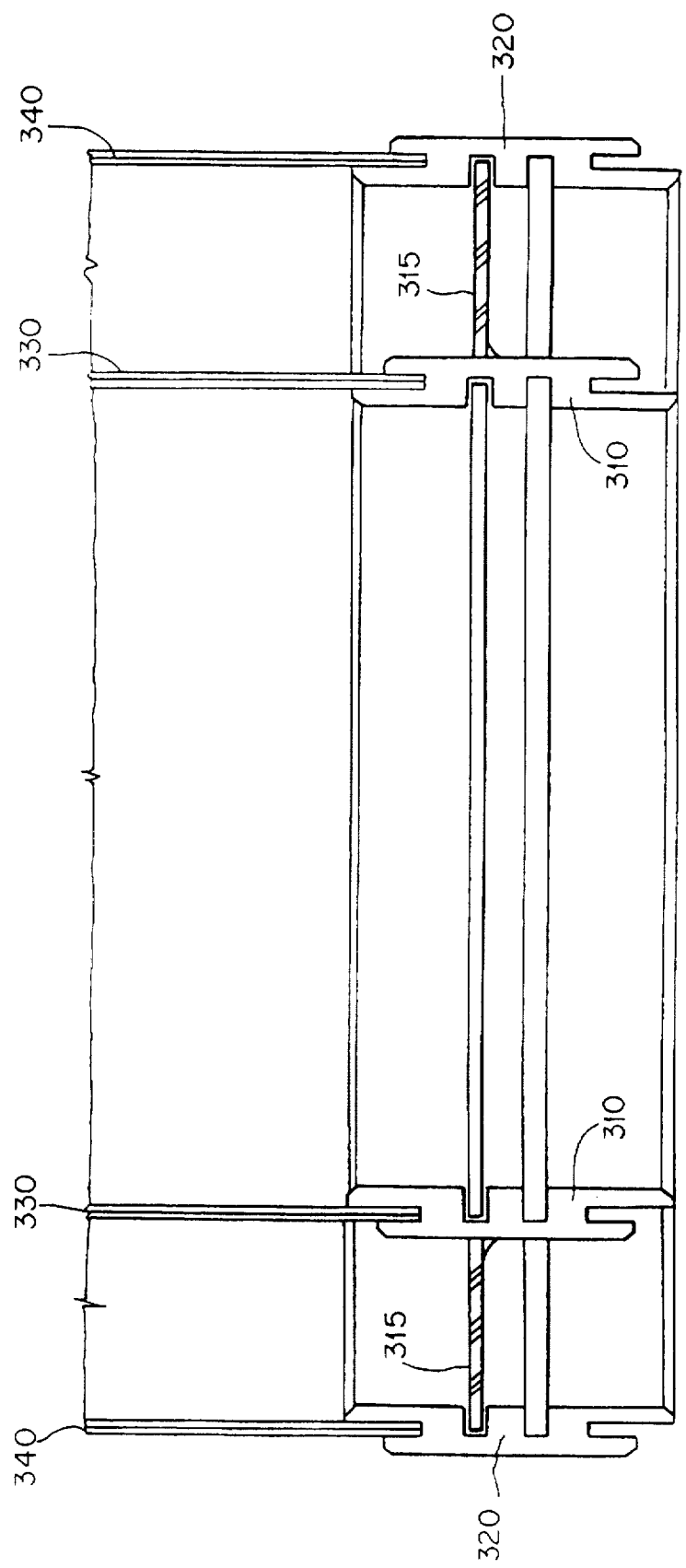
FIG. 20 illustrates a tube-in-a-tube embodiment of the present invention.
Figure 24:
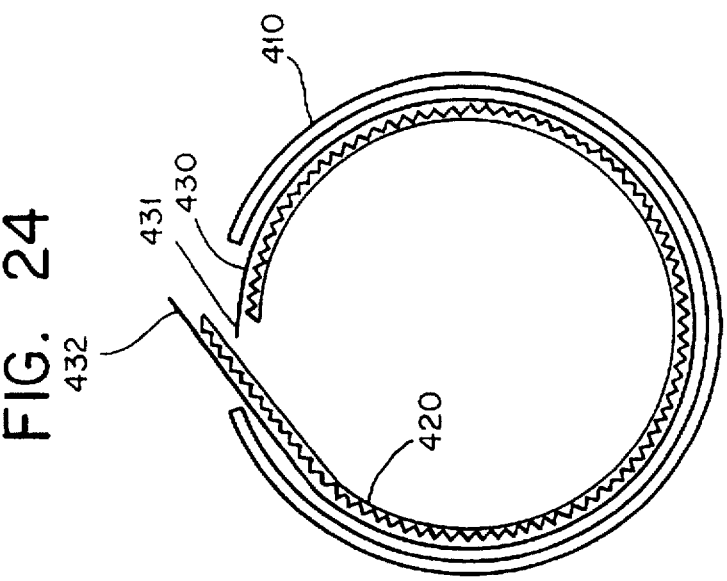
Figure 23:
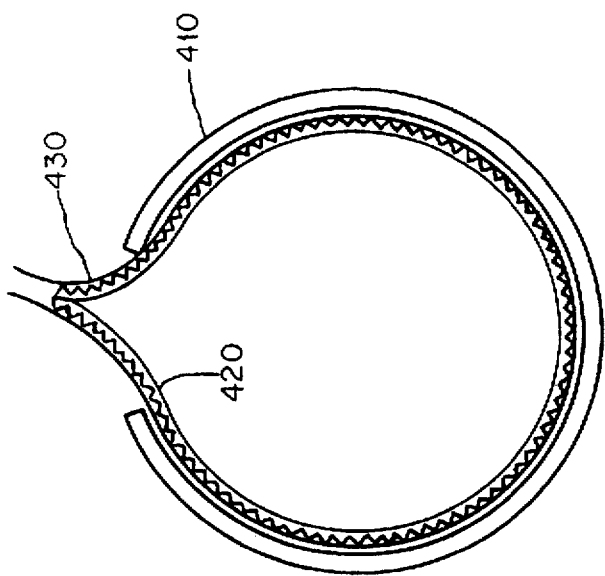

FIG. 20 illustrates a still further use for the illustrated rings wherein a tube-in-a-tube construction is formed using an inner retaining ring 310 which is positioned inside an outer retaining ring 320 having a larger diameter. In the manner illustrated in FIG. 20 the inner retaining ring 310 is positioned by a spacer ring 315 which is held in place by an inwardly facing groove of outer retaining ring 320. The spacer ring 315 can be formed of any substantially rigid material, for example a metal or a plastic. The spacer ring 315 is most preferably heat resistant. This tube-in-a-tube construction is particularly useful for providing a protective casing 340 for a light tube 330 and/or providing a colored or finished cover to create a desired light effect. Casing 340 can advantageously comprise a plurality of layers.

Another aspect of the present invention comprises methods of forming light tubes within pre-formed carriers, for example polycarbonate tubes. From the description below, those skilled in the art will appreciate that the methods described herein may also be utilized to form light tubes in carriers that are not circular in cross-section as well as carriers that are not completely continuous, i.e. closed in cross-section. One method of forming light tubes within a cylindrical carrier is illustrated in FIGS. 21–28. These methods are particularly useful in forming light tubes within pre-formed cylindrical tubes. For example, light tubes having a diameter of 4 inches can be readily formed in lengths of 20 feet.

With reference to FIG. 21, the first step comprises providing a gutter 410 preferably having a length equal to the length of the final light tube and a longitudinal relieved section defined by opposing side walls of gutter 410 through which an optical light film can be inserted. From the description above, it will be appreciated that in order to conduct light, optical light films used with the various embodiments of the present invention have a plurality of prismatic grooves/peaks which face outwardly when the optical light film is formed into a light tube. In order to prevent these peaks/grooves from being damaged along the edges of gutter 410, a protective sheet 430 is advantageously placed between the optical light film and the gutter 410. The protective sheet 430 is preferably formed of a material which has is pliable and has a substantially low coefficient of friction with the other elements utilized during this assembly procedure. For example, when the gutter 410 is formed of a polycarbonate, protective sheet 430 may be formed of a material such as Tyvek™ sold by DuPont of Wilmington, Del.

Figure 22:
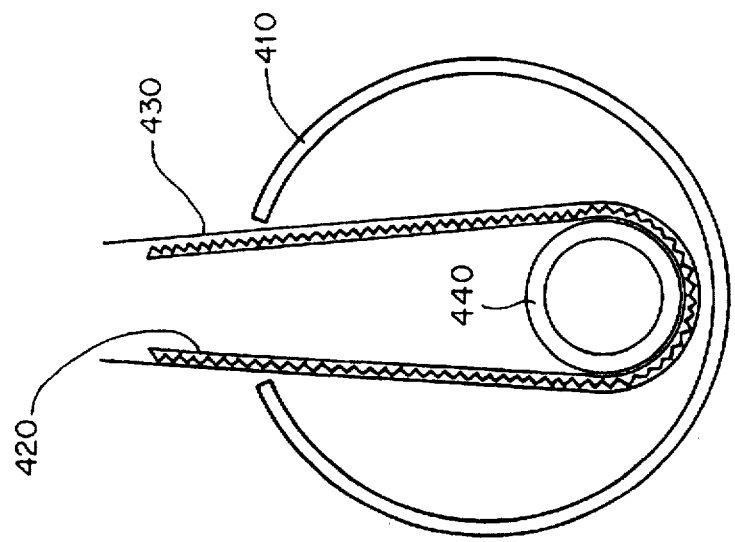

With the protective sheet 430 in place, the optical light film 420 can then be pushed into gutter 410 with the help of a weighted rod 440 in the manner shown in FIG. 22. The heavy rod 440 is then removed and the optical light film 420 and protective sheet 430 can be adjusted inwardly to correspond with the general shape of gutter 410 in the manner shown in FIG. 23. The lower edge 431 of protective sheet 430 is then folded under the upper edge 432 in the manner illustrated in FIG. 24 and then the upper edge 432 is also folded inwardly such that the entire optical light film 420 and protective sheet 430 are disposed within gutter 410 in the manner shown in FIG. 25. Since gutter 410 has a diameter less than the diameter of the tube 450 into which the optical light film will be ultimately disposed, gutter 410 is then simply inserted into an open end of tube 450.

Figure 27:
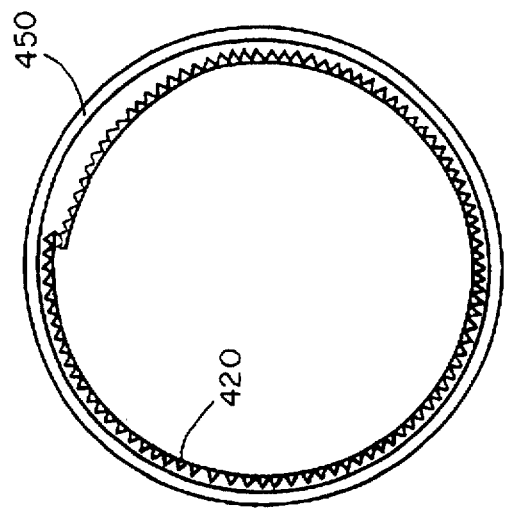
Figure 26:
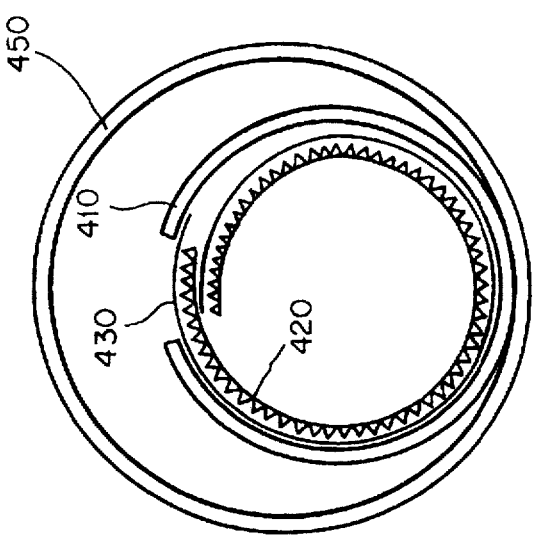
Figure 25:
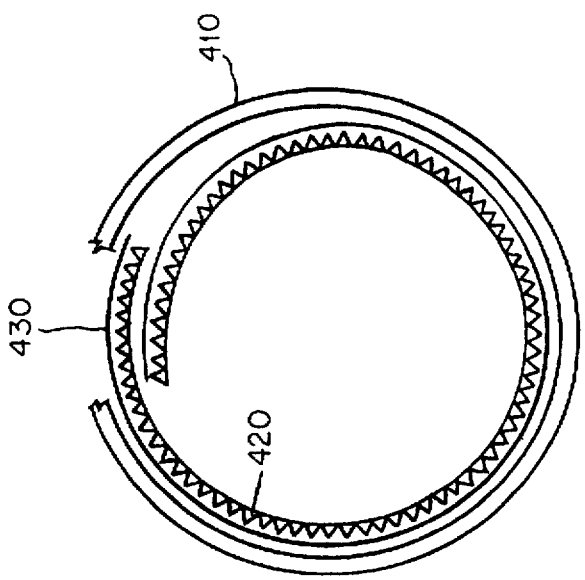

According to this embodiment of the present invention, the optical light film 420 is then attached, e.g. clamped, to the end of outer tube 450 and the gutter 410 and protective sheet 430 are removed from the other end, leaving optical light film 420 within outer tube 450 in the manner shown in FIG. 27. If the optical light film, due to its inherent resiliency and elasticity, does not conform to the inner surface of outer tube 450, a plunger 460, for example having a cross-section such as the one shown in FIG. 29, can be pushed into the interior of optical light film 420 forcing the optical light film 420 outwardly such that the opposing edges of optical light film 420 snap into position as shown in FIG. 28.

According to another embodiment of the present invention which provides an alternative method for installing an optical light film into a closed rigid tube, the steps illustrated in FIGS. 21–25 are repeated. The longitudinal recess of the gutter 410 may optionally be blocked to prevent the optical light film 420 and protective sheet 430 from working their way out of gutter 410. In this embodiment, one end of gutter 410 is then aligned with an open end of outer tube 450, a flexible lead is fed through outer tube 450 and attached to protective sheet 430 and optical light film 420. The protective sheet 430 and optical light film 420 are then drawn out the open end of gutter 410, which is maintained substantially outside of outer tube 450, and into outer tube 450.

The protective sheet 430 is preferably a flexible material having a low coefficient of friction and is substantially tear-resistant such that it will not tear upon contact with the edges of the gutter 410. While any low friction, tear-resistant material can be utilized, the material which has been found useful is Tyvek™ made by Dupont, of Wilmington, Del.

The protective sheet 430 can then be readily removed in the manner described above by clamping one end of the optical light film 420 to the outer tube 450 and drawing the protective carrier 430 out the other end. If the optical film 420 did not conform to the inner surface of tube 450, for example as shown in FIG. 27, the plunger 460 illustrated in FIG. 29 can again be utilized in the manner described above.

Unlike methods heretofore described and utilized in the art, the methods of the present invention provide for ways of positioning optical light film within rigid tubes with a minimal amount of manpower. Previous methods which required the rolling of a sheet of optical light film within an outer protective, lowfriction sheet required numerous pairs of hands, and were therefore cost-intensive. Another disadvantage of such methods was that the rolled-up optical light film and protective sheet would tend to unroll and would become very difficult to push into the outer tube. Another disadvantage is that the fragile optical light film cannot withstand too much pushing before fracturing. The methods of the present invention advantageously minimize the amount of stress placed on the fragile optical light film.

Another aspect of the present invention comprises a method of disposing an extractor in a light tube proximate an optical light film in a neat, efficient manner. This method is particularly useful with extractors which reflect incident light at a variety of different angles. For example, a product marketed under the name SCOTCHCAL™ sold by the 3M Company of St. Paul, Minn. is one such extractor. Typically such extractors are installed using a coating of water to facilitate the positioning of the extractor on the surface to which the extractor will be attached. Those skilled in the art will appreciate that wetting an optical light film can be detrimental to the internal-reflectance properties of the film and should, whenever possible, be avoided. This method of the present invention therefore comprises first connecting the extractor to a thin film and then disposing the extractor/ thin film laminate onto the configured sheet of optical light film. Those skilled in the art will appreciate that the present method avoids the need for working with water in the presence of the optical light film and the inherent risks of wetting the grooves of the optical light film.

One embodiment of the present invention is directed to a light carrier comprising at least one sheet of optical light film 510 which is maintained in a tube configuration by a novel joint. The optical light film preferably has enough flexibility and sufficient width so that one longitudinal edge 511 can be moved to a position proximate the other longitudinal edge 512 thereby forming a tube, preferably having a generally cylindrical shape.

Figure 30:
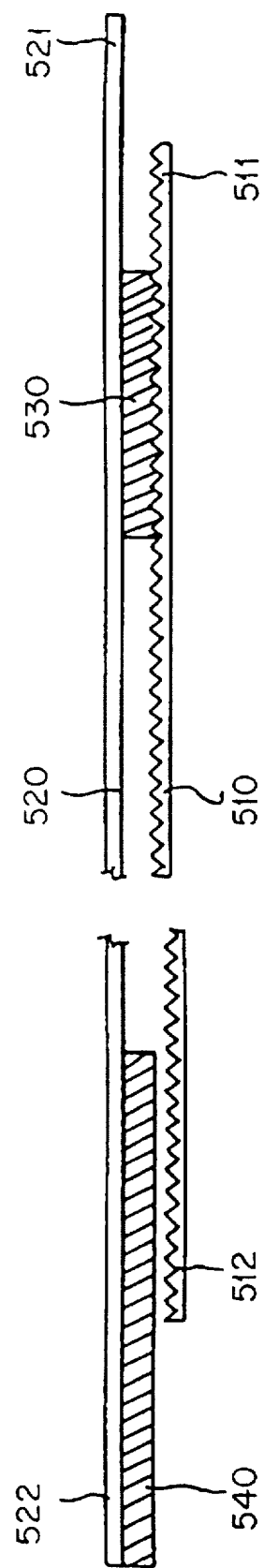
FIGS. 30 and 31 are cross-sectional views of one embodiment of a light tube of the present invention.
Figure 31:
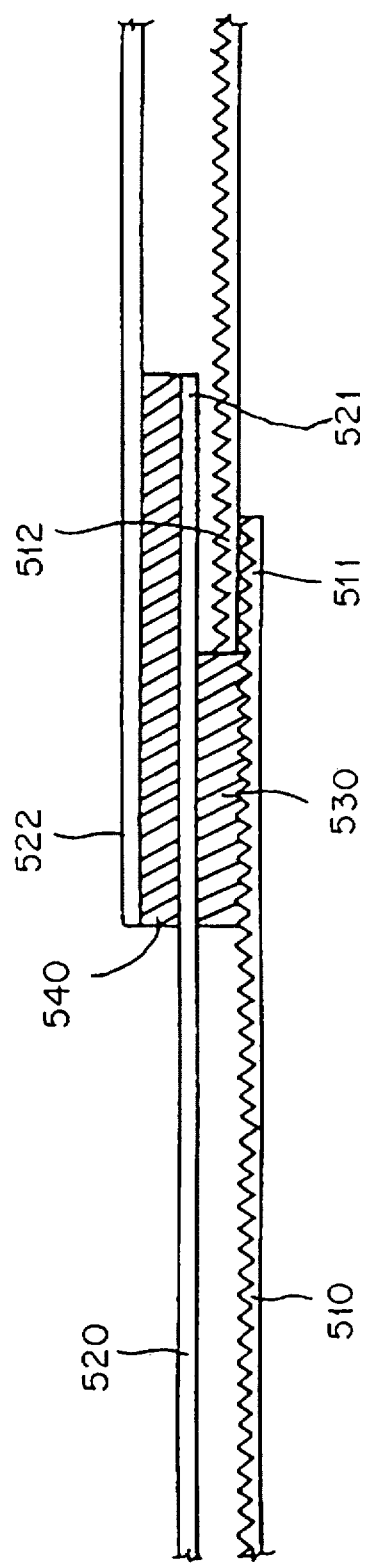

The manner of forming one light tube of the present invention is best illustrated with reference to FIGS. 30 and 31 wherein an optical light film 510 is protected by an outer protective sheet 520 with a use of first connector 530 and a second connector 540. In the manner illustrated in FIG. 30, the first connector 530 is most preferably disposed slightly remote from longitudinal edge portion 511 and is also preferably connected to the outer protective sheet 520 at a contact region slightly remote from a first longitudinal edge 521. In this manner, a slot is defined by the outer surface of edge region 511 of optical light film 510, the connector 530 and the inner side of edge region 521 of protective sheet 520. Therefore, when optical light film 510 is configured into a tube and the second longitudinal edge region 512 is brought around proximate longitudinal edge 511, the second longitudinal edge region 512 can be readily inserted into the slot. In order to maintain the opposing edges of the outer protective sheet 520 in position, a second connector 540 is preferably positioned between the outer surface of protective sheet 520 proximate first longitudinal edge 521 and the inner surface of protective sheet 520 proximate the second longitudinal edge 522. As shown in FIG. 30, the second connector 540 can readily be positioned prior to configuring the sheets into a tube. Since some adhesive tapes which may be used as connectors with the various embodiments of the present invention are provided with liners which protect the adhesive surface before use, one side of such tapes can be adhered to an optical light film or a protective sheet while leaving the other side of the adhesive tape covered by the protective liner. That liner could then be subsequently removed at a different location prior to final assembly. While one preferred embodiment of this invention aligns the second connector 540 with the opposing edges of protective sheet 520, such alignment is not necessary in order to obtain the benefits of the present invention.

The connectors used to join the sheets of the present invention preferably comprise strips of tape, most preferably a two-sided adhesive tape or a tape exhibiting adhesive properties throughout such that both sides and the edges of the tape are sufficiently sticky. One such tape is a Very High Bond Tape available from the 3M Corporation of St. Paul, Minn. which exhibits adhesiveness throughout. Particularly a clear Very High Bond Tape designated "4910" is particularly useful for bonding the smooth surfaces of the outer protective sheet 520, while a white Very High Bond Tape having the designation "4952" is particularly useful for connecting the outer, ridged surface of the optical light film to another surface. It has been found that the clear tape has a tendency to withdraw from the grooves on the outer surfaces of an optical light film resulting in a reduction in adhesion. Those skilled in the art will also appreciate that the thickness and/or width of the adhesive tape utilized can be varied for different applications depending upon such factors as the strength required and any thickness characteristics inherent in the particular tube design.

The various embodiments of the present invention can readily be partially or totally assembled at or close to the site of their ultimate use. Assembly at such locations greatly reduces the cost of shipping since the sheets can be shipped in a flat configuration requiring much less volume than assembled tubes. These and other advantages of the present invention will be apparent to those skilled in the art.

Figure 32:
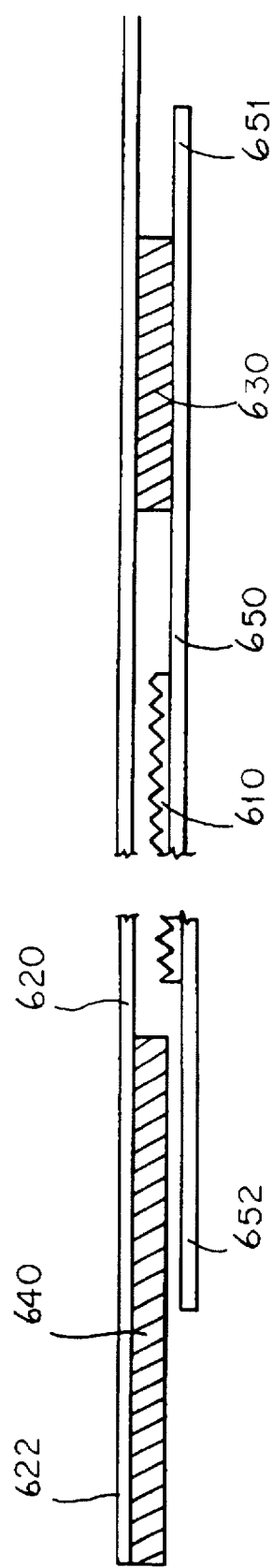
FIGS. 32 and 33 are cross-sectional views illustrating another embodiment an optical light tube of the present invention.
Figure 33:
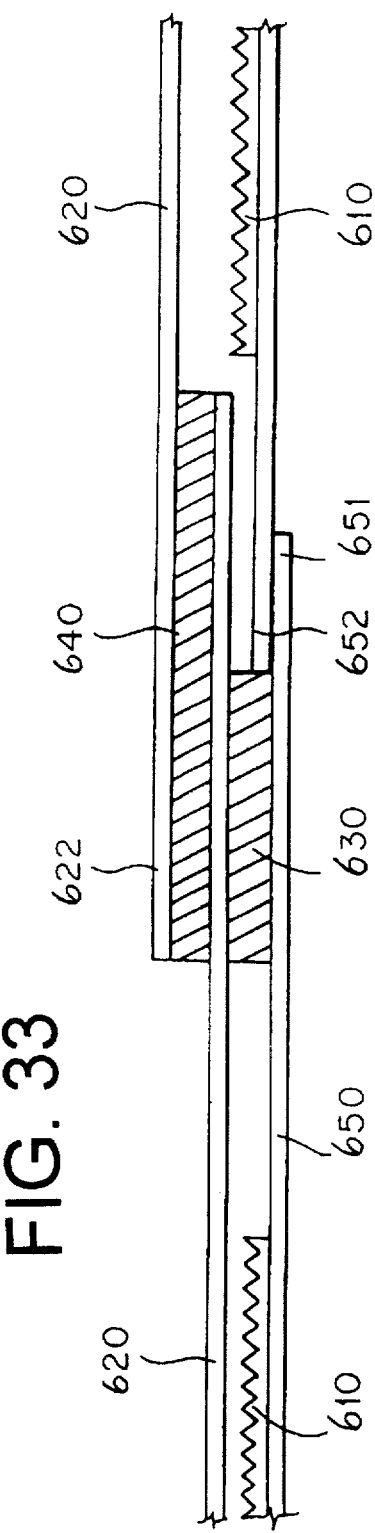

An alternative embodiment of the present invention is illustrated in FIGS. 32 and 33. In this embodiment, at least one optical light film 610 is substantially sandwiched between an outer protective sheet 620 and a separate inner protective sheet 650. Those skilled in the art will appreciate that inner protective sheet 650 is most preferably clear. The two protective sheets are configured and connected in the same fashion as the optical light film and outer protective sheet illustrated in FIGS. 30 and 31. A first connector 630 is utilized to connect an outer surface remote from a first edge of region 651 of inner sheet 650 with an inner surface of outer sheet 620 in a manner that forms a slot which receives a second edge portion 652 of inner sheet 650. The second edge 622 of outer sheet 620 is then configured substantially around the inner protective sheet 650 using a second connector 640 while at least one sheet of optical light film 610 is substantially sandwiched between outer sheet 620 and inner sheet 650. Since the protective sheets are not being connected to an optical light film, it is desirable to use a clear Very High Bond Tape such as the "4910" tape referenced above.

This embodiment of the present invention offers several significant advantages. Primarily, a plurality of optical light films can be readily positioned at discrete locations in the tube leaving sections of the tube without optical light film. Those skilled in the art will appreciate that controlled amounts of light and various patterns can be provided by leaving gaps between discrete sheets of optical light film or by providing light films having extractors or holes which permit the "escape" of light from the light tube.

Figure 34:
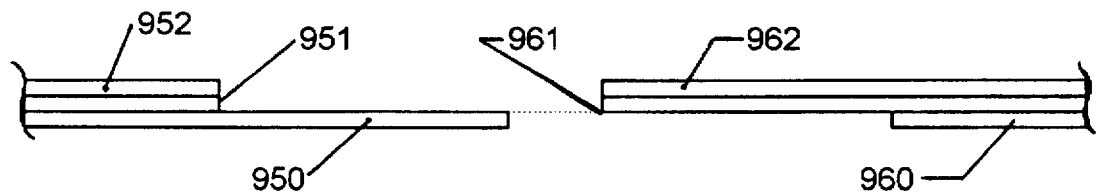
FIGS. 34 and 35 illustrate a terminal, overlapping joint of one embodiment of the present invention.
Figure 35:
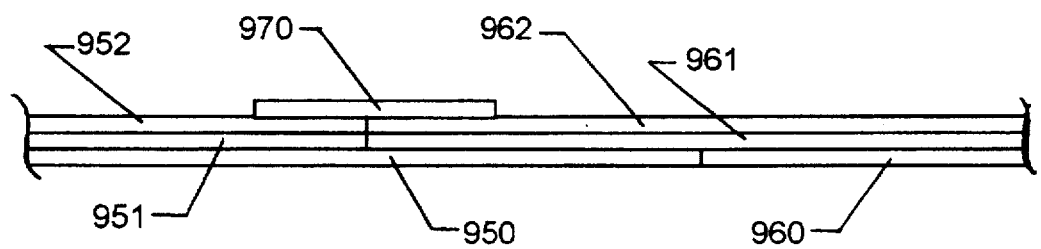

Illumination devices of the present invention can also be connected at their terminal ends in order to increase the effective length of the device. One aspect of the present invention, illustrated in FIGS. 34 and 35, comprises arranging adjacent sections of a multi-section tube in an overlapping manner. Unlike the other cross-sectional views described above, each of these views illustrates portions of two separate tube segments which are joined at their terminal ends. In this illustrated embodiment, a first segment comprises a terminal edge of a first sheet of optical light film 950 which extends beyond the edges of two other sheets 951 and 952 of the first segment. In a second segment, the optical light film 960 does not extend to the ends of other sheets 961 and 962. As shown in FIG. 35, when the two segments are joined, the outer two sheets 961 and 962 of the second segment will overlap the optical light film 950 of the first segment. This overlap of sheets from adjacent segments will strengthen the connection between the segments. As shown in FIG. 35, an additional connector 970 such as a single-sided tape may be used to hold the segments together.

Another aspect of the present invention comprises a method of disposing an extractor in a light tube proximate an optical light film in a neat, efficient manner. This method is particularly useful with extractors which reflect incident light at a variety of different angles. For example, a product marketed under the name SCOTCHCAL™ sold by the 3M Company of St. Paul, Minn. is one such extractor. Typically such extractors are installed using a coating of water to facilitate the positioning of the extractor on the surface to which the extractor will be attached. Those skilled in the art will appreciate that wetting an optical light film can be detrimental to the internal-reflectance properties of the film and should, whenever possible, be avoided. This method of the present invention therefore comprises first connecting the extractor to a thin film, such as G. E. Lexan® suede film and then disposing the extractor/thin film laminate onto the configured sheet of optical light film. A suede film advantageously increases the light scattering effect of the extractor. Those skilled in the art will appreciate that the present method avoids the need for working with water in the presence of the optical light film and the inherent risks of wetting the grooves of the optical light film.

Figure 38:
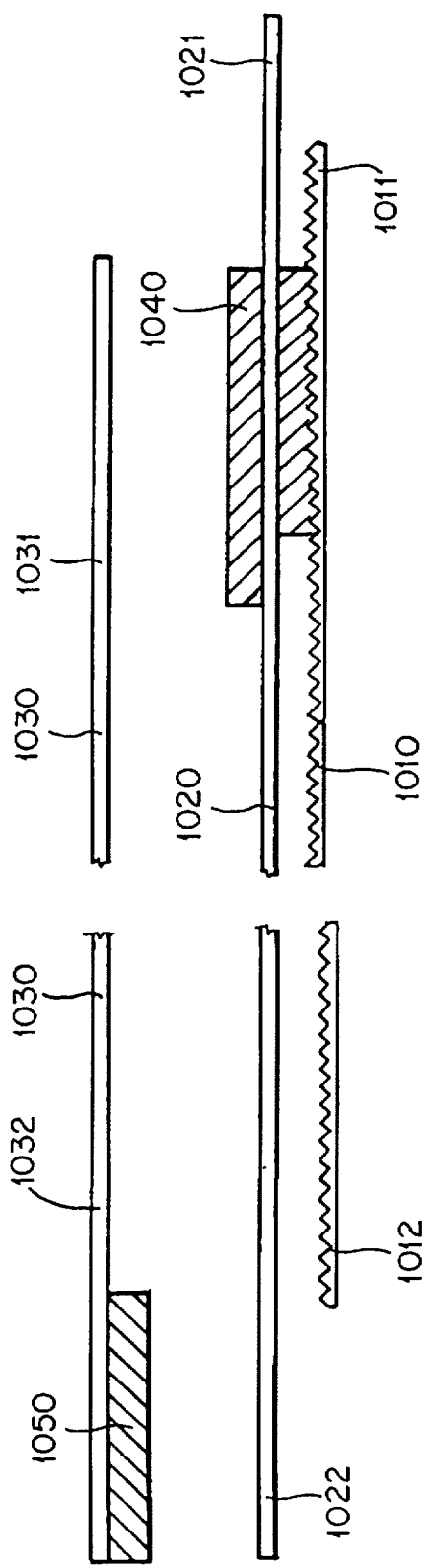
FIGS. 38 and 39 are partial, cross-sectional views of a light carrier of an alternative embodiment of the present invention.
Figure 39:
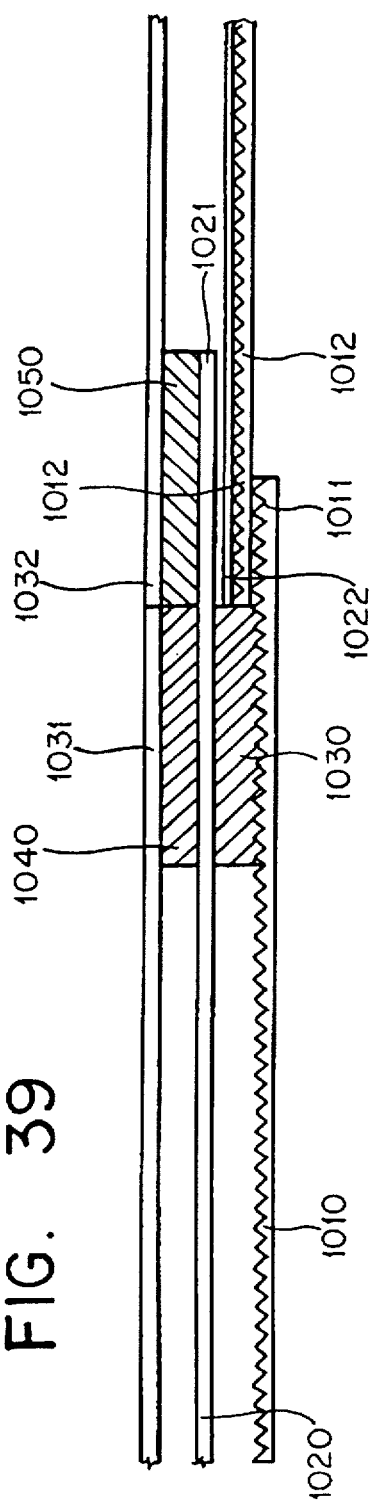

Another embodiment of the present invention is directed to a light carrier comprising an optical light film disposed within two substantially transparent sheets. As illustrated in FIGS. 38 and 39, an optical light film 1010 comprises a first edge region 1011 and a second edge region 1012. According to this illustrated embodiment, a connector 1030 is advantageously positioned remote from edge 1011 of optical light film 1010 and contacts a transparent middle sheet 1020 at a position remote from a first longitudinal edge 1021 of the middle sheet 1020. In this manner, connector 1030 thereby forms a slot into which the opposite edge portion 1012 of optical light film and/or longitudinal edge region 1022 of middle sheet 1020 may be inserted when the films are formed into a generally tube configuration, as illustrated in part in FIG. 39. An outer sheet 1030 comprises a first edge region 1031 and a second edge region 1032. According to this preferred embodiment of the present invention, the opposing longitudinal edge regions of the outer sheet 1030 are positioned in abutting relation when the light carrier is formed. In order to effect this desired configuration, a second connector 1040 is positioned on the outer surface of middle sheet 1020 at a position remote from first longitudinal edge 1021 and in alignment with edge region 1031 of outer sheet 1030. In this manner, the edges of connector 1040 and first edge region 1031 are most preferably aligned. A third connector 1050 is advantageously disposed on the inner surface of the second edge region 1032 of outer sheet 1030 such that when the outer sheet 1030 is formed into a generally tubular configuration, the third connector 1050 connects the second edge region 1032 of outer sheet 1030 with the outer surface of first edge portion 1021 of middle sheet 1020. As shown in FIG. 39, the edges of outer sheet 1030 are advantageously, but not necessarily, disposed in abutting relation in order to provide a light carrier having a smooth outer surface.

While different types of connectors may be utilized without departing from the scope of this embodiment of the present invention, one preferable material for first connector 1030 comprises a double-sided, opaque tape specifically designed to hold the outer grooves of optical light film 1010 securely for extended periods of time. Connectors 1040 and 1050 may comprise substantially transparent double-sided tapes. For example, the adhesive tape can be a Very High Bond Tape available from the 3M Corporation of St. Paul, Minn. which exhibits adhesiveness throughout. Those skilled in the art will also appreciate that the thickness of the adhesive tape utilized can be varied for different applications depending upon such factors as the strength required and any thickness characteristics inherent in the particular tube design.

According to one preferred embodiment of the present invention, the middle film comprises Lexan® available from G. E. Plastics, Inc., U.S.A. having a matte/velvet finish, e.g. Model 8B35, which is a diffusing film. The outer sheet preferably comprises Lexan® and most preferably comprises enhanced ultraviolet stability for outdoor use. For example, Lexan® Model HP92W, also available from G.E. Plastics, U.S.A., offers desirable ultraviolet stability and abrasion resistance.

From the present description, it will be appreciated that rings, such as the heat resistant retaining rings described above, will have many uses in illumination devices. Rings constructed in the fashion illustrated in FIGS. 36 and 37 may also be utilized with other illumination devices.

Figure 36:
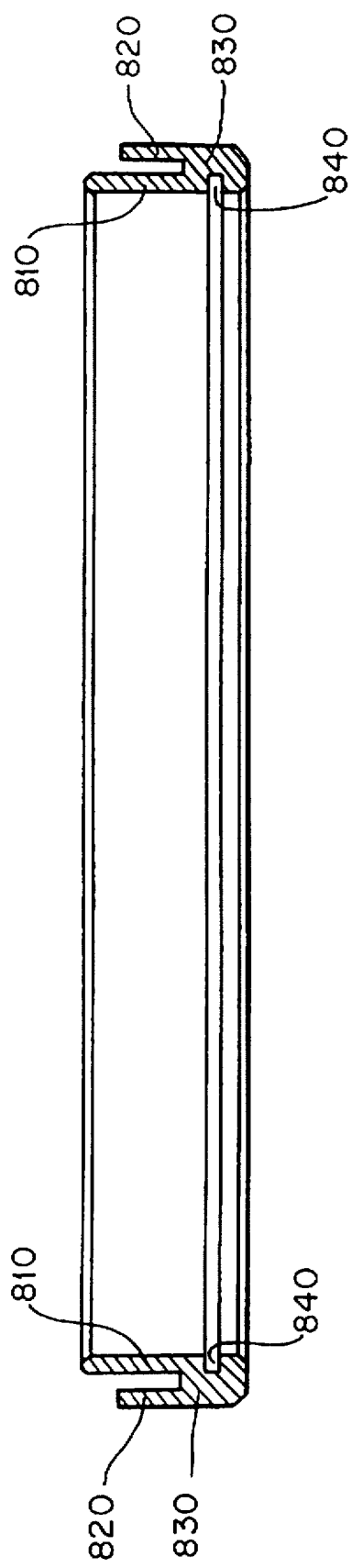
FIG. 36 illustrates a connector ring of another embodiment of the present invention.
Figure 37:
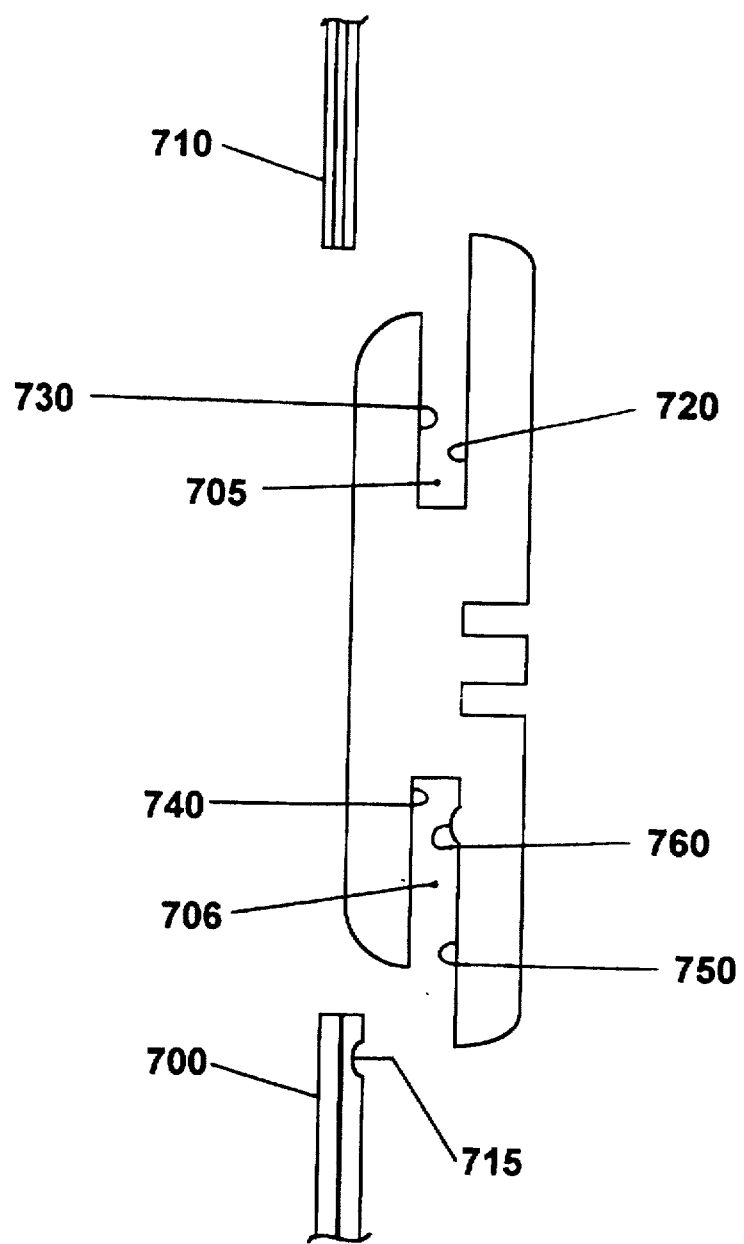
FIG. 37 illustrates a still further connector ring of another embodiment of the present invention.

FIG. 36 illustrates a silicon ring of the present invention comprising a single axial slot and a radial slot. The axial slot is defined by an inner wall 810 and an outer wall 820 which extend from a body portion 830. An axial groove 840 faces inwardly in this illustrated embodiment. Inwardly facing radial groove 840 may be utilized to support a lens, a piece of tempered glass, a mirror, or some other desired element. The ring illustrated in FIG. 36 the axial groove can be utilized to receive a portion of a lamp housing or a light tube. Additionally, from the present description, those skilled in the art will appreciate that other connecting members can be connected to the illustrated ring, for example, to body portion 830 in order to connect other desired elements. For example, the rim of a light tube could be positioned within the axial slot while a lamp housing could be connected to body portion 830. As illustrated in FIG. 37, one embodiment of the present invention comprises a double axial slot configuration wherein the retaining ring comprises an upper axial slot 705 and a lower axial slot 706. The upper axial slot 705 being defined by inner wall 720 and outer wall 730 and the lower axial slot 706 being defined by outer wall 740 and inner wall 750. In this particular embodiment, upper slot 705 receives optical light film 710 and lower slot 706 receives bulb housing 700. Flange 760 projects from inner wall 750 and into lower slot 706 and acts as a retaining means for bulb housing 700. Bulb housing 700 comprises a recess 715 for receiving flange 760 to retain bulb housing 700 in position. From the present description, those skilled in the art will appreciate that the ring shown in FIGS. 36 and 37 have broad applications with illumination devices. While the upper and lower axial slots above have been generally described as being vertically oriented, it is conceivable that the slots could be disposed in a more horizontal fashion or at virtually any angle.

I claim:

1. A light carrier comprising:
   a sheet of optical light film comprising a first longitudinal edge portion and a second longitudinal edge portion, said optical light film having sufficient flexibility to allow said first longitudinal edge portion to be disposed in a position proximate said second longitudinal edge portion;
   a second sheet comprising a first longitudinal edge, a second longitudinal edge, and a first contact region remote from said first longitudinal edge; and
   means for maintaining said optical light film in a tube configuration comprising a first connector having at least one adhesive portion, said first connector connected to said optical light film at a first distance from said first longitudinal edge portion and to said second sheet at a second distance from said first longitudinal edge; and
   wherein said first distance is less than said second distance.

2. A light carrier comprising:
   an optical light film formed into a light tube;
   a substrate; and
   an extractor laminated to said substrate wherein said substrate-extractor laminate is disposed within said tube.

3. A light carrier according to claim 2 wherein said substrate provides light scattering properties.

* * * * *